United States Patent
Eker et al.

(10) Patent No.: US 8,534,543 B1
(45) Date of Patent: Sep. 17, 2013

(54) SYSTEM AND METHOD FOR AUTHENTICATING A MANUFACTURED PRODUCT WITH A MOBILE DEVICE

(75) Inventors: Steven Mark Eker, East Palo Alto, CA (US); Patrick D. Lincoln, Woodside, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 13/475,312

(22) Filed: May 18, 2012

(51) Int. Cl.
*G06F 17/00* (2006.01)

(52) U.S. Cl.
USPC .......................................................... 235/375

(58) Field of Classification Search
USPC ......................................................... 235/375
See application file for complete search history.

(56) References Cited

U.S. PATENT DOCUMENTS

| | | | |
|---|---|---|---|
| 6,543,692 B1* | 4/2003 | Nellhaus et al. | 235/462.01 |
| 6,776,341 B1* | 8/2004 | Sullivan et al. | 235/462.01 |
| 6,799,725 B1 | 10/2004 | Hess et al. | |
| 6,820,201 B1 | 11/2004 | Lincoln et al. | |
| 7,117,363 B2 | 10/2006 | Lincoln et al. | |
| 7,253,716 B2 | 8/2007 | Lovoi et al. | |
| 7,370,797 B1 | 5/2008 | Sullivan et al. | |
| 7,550,197 B2 | 6/2009 | Kittler, Jr. et al. | |
| 7,599,544 B2 | 10/2009 | Moshe | |
| 7,647,193 B2 | 1/2010 | Francis et al. | |
| 7,770,783 B2* | 8/2010 | Grant et al. | 235/375 |
| 7,941,376 B2 | 5/2011 | Peckover | |
| 8,080,097 B2 | 12/2011 | Chinea et al. | |
| 2006/0028727 A1 | 2/2006 | Moon et al. | |
| 2006/0222702 A1* | 10/2006 | Barreto et al. | 424/464 |
| 2006/0226234 A1* | 10/2006 | Kettinger et al. | 235/487 |
| 2007/0048365 A1* | 3/2007 | Rao | 424/451 |
| 2007/0086625 A1* | 4/2007 | Polli et al. | 382/115 |
| 2007/0160814 A1* | 7/2007 | Mercolino | 428/195.1 |
| 2007/0241177 A1* | 10/2007 | Tuschel et al. | 235/375 |
| 2007/0259100 A1* | 11/2007 | Yoo et al. | 424/400 |
| 2009/0321623 A1* | 12/2009 | Ross et al. | 250/271 |
| 2011/0053639 A1* | 3/2011 | Etienne Suanez et al. | 455/556.1 |
| 2011/0186629 A1* | 8/2011 | Stuck et al. | 235/380 |
| 2012/0278096 A1* | 11/2012 | Holness | 705/2 |

FOREIGN PATENT DOCUMENTS

WO   0065541 A1   11/2000

OTHER PUBLICATIONS

Ross, Will, "Nigerian texters to take on the drug counterfeiters," BBC News, Jan. 10, 2013, 4 pages, available at http://www.bbc.co.uk/news/world-africa-20976277.

U.S. Appl. No. 13/475,320, by Eker et al., filed May 18, 2012, 85 pages.

(Continued)

*Primary Examiner* — Daniel Hess
*Assistant Examiner* — Steven J Malone
(74) *Attorney, Agent, or Firm* — Barnes & Thornburg LLP

(57) ABSTRACT

A system and method for authenticating an individual item of a manufactured product with a mobile computing device includes generating a first identifier including an at least partially random visual feature on the item during manufacture of the item, and generating a second identifier associated with the item, where the second identifier is cryptographically related to the first identifier. One or more digital images of the first and second identifiers may be created by a camera of the mobile computing device. The digital images may be used to validate the authenticity of the item at the mobile computing device.

31 Claims, 9 Drawing Sheets

(56) References Cited

OTHER PUBLICATIONS

Burdick, Alan, "Tech 2010: #19 Words to Live by; The Document That Can't Be Forged," The New York Times, Jun. 11, 2000, 1 page.
Sigmaphone, LLC, "iPharmacy," 5 pages.
Waters, Dr. Laura, "Barcode for Pills Just the Medicine: New Methods to Beat Counterfeiters," Oldham Evening Chronicle, Mar. 9, 2010, 2 pages, available at http://www.oldham-chronicle.co.uk/news-features/print/46562.
"Pharmaceutical Industry Backs 2D Bar Code Technology," ADC Nordic, 3 pages, available at http://www.adcnordic.com/news/efpia-backs-2d-bar-code.php.
Department of Consumer Affairs Board of Pharmacy, "Information on E-Pedigree," 3 pages, available at http://www.pharmacy.ca.gov/about/e_pedigree.shtml.
"Tablet Coating," Apteka-95, 2 pages, available at http://apteka95.com.ua/en/directions/1806/.
"Chewing Gum Infused with Type 2 Medicine?" Diabetes Health, May 15, 2008, 3 pages, available at http://www.diabeteshealthcom/read/2008/05/15/5755/chewing-gum-infused-with.
Burnsed, Brian, "The Most Counterfeited Products," Bloomberg Businessweek, 7 pages, available at http://images.businessweek.com/ss/08/10/1002_counterfeit/index.htm.
Grow, Brian, et al., "Dangerous Fakes," Bloomberg Businessweek, Oct. 1, 2008, 5 pages, available at http://www.businessweek.com/printer/articles/218114-dangerous-fakes?type=old_article.
Fahrni, Jerry, "Laser Etched Bar-Code May Help Curb Counterfeit Drugs, Among Other Uses," Sep. 1, 2010, 4 pages, available at http://jerryfahrni.com/2010/09/laser-etched-bar-code-may-help-curb-counterfeit-drugs-among-other-uses/.
Wu, Min, "Digital Fingerprinting for Multimedia Security and Forensics," Oct. 2007, 3 pages, available at http://www.ece.umd.edu/~minwu/research/ACC_Fingerprint.html.
Gilbertson, Scott, "EFF Reveals How Your Digital Fingerprint Makes You Easy to Track," Webmonkey, Jan. 28, 2010, 2 pages, available at http://www.webmonkey.com/2010/01/eff_reveals_how_your_digital_fingerprint_makes_you_easy_to_track.
"Digital Photo and Signature Module," Percs Index, Inc., 1 page, available at http://www.percs.com/digital-photo-signature-module.html.
Crossland, Thomas et al., "The 'Faked' Fuji Print," Ukiyoe-Gallery.com, Jan. 2004, 7 pages, available at http://www.ukiyoe-gallery.com/fake-fuji.htm.
mPedigree Network, "We are the mPedigree Network," available at http://www.mpedigree.net/mpedigree/index.php, 2 pages.
Sinba, Kounteya, "Soon, Bar Code & Unique Number on Pill Strips to Check Fakes," The Times of India, Feb. 20, 2011, 3 pages, available at http://articles.timesofindia.indiatimes.com/2011-02-20/india/28625630_1_bar-code-counterfeit-drug-controller.

\* cited by examiner

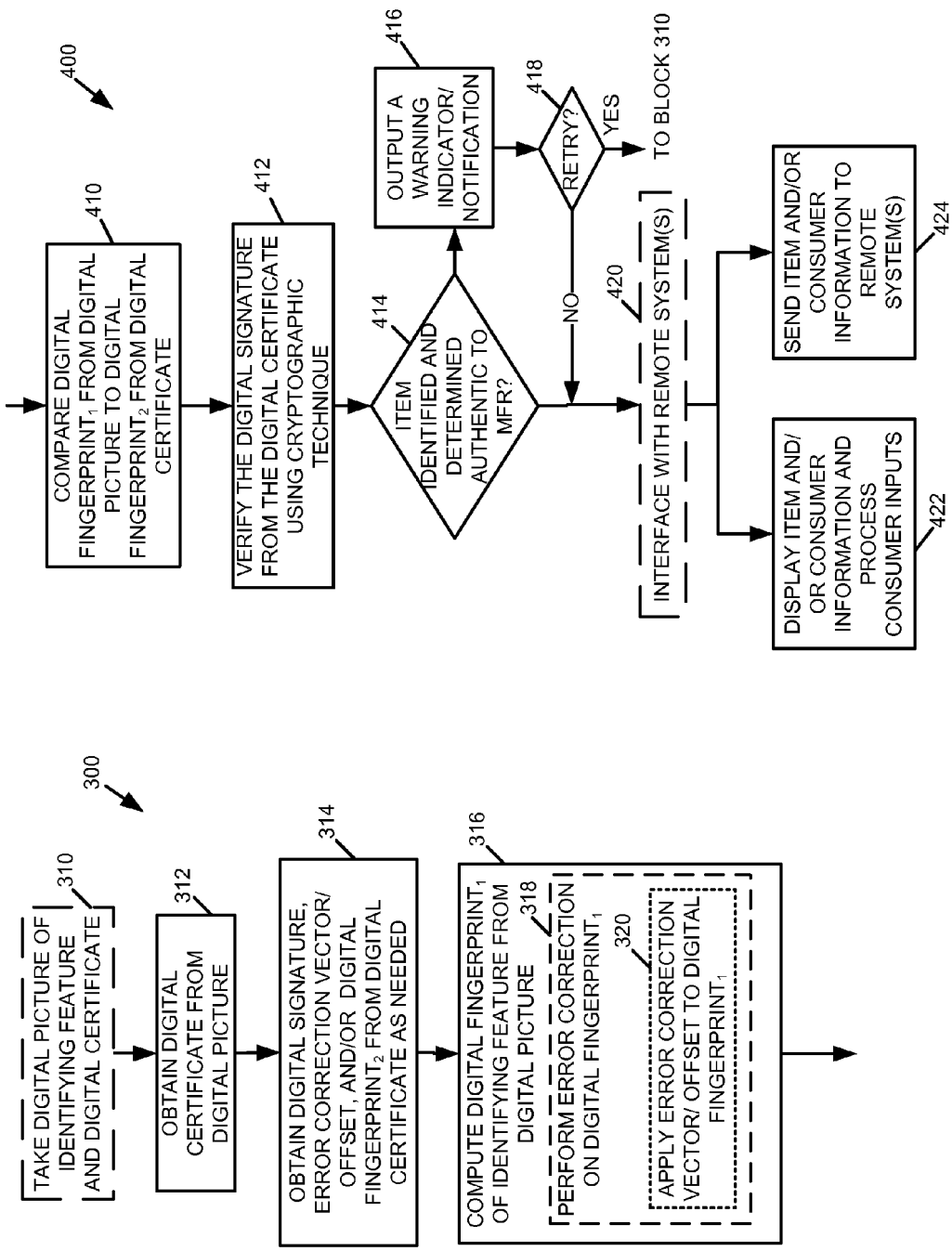

SYSTEM AND METHOD FOR AUTHENTICATING A MANUFACTURED PRODUCT WITH A MOBILE DEVICE

BACKGROUND

For many manufacturers, efforts to prevent counterfeiting of their products, or to at least to make counterfeiting more difficult, are ongoing. At the same time, counterfeiters are working, often with the aid of technological advancements, to evade or disrupt anti-counterfeiting measures and to produce higher-quality counterfeit goods. Counterfeit products are problematic for many reasons. They can adversely affect the market for the authentic goods, defraud the purchaser, and even (where ingestible products are involved, for example) cause physical harm to consumers.

SUMMARY

According to at least one aspect of this disclosure, a system for protecting an article of manufacture from counterfeiting includes at least one computing device configured to generate an at least partially random visual feature that cannot be economically duplicated in a surface of the article during manufacture of the article, create a digital certificate from a first digital representation of the at least partially random visual feature and a first cryptographic key, apply an identifier embodying the digital certificate to the article so as not to obscure the at least partially random visual feature, analyze a second digital representation of the at least partially random visual feature, and authenticate the article based on the analyzed second digital representation and the digital certificate using a second cryptographic key. The system may be configured to display information relating to authentication of the article at a personal mobile consumer electronic device. The system may be configured to send information relating to authentication of the article to at least one of a product tracking system for tracking the location of counterfeit versions of the article and a usage monitoring system for monitoring usage of the article by one or more persons.

Further, according to at least one aspect of this disclosure, an article of manufacture includes a first identifier includes an at least partially random feature that cannot be economically duplicated, results from manufacture of the article and is defined to uniquely distinguish the individual article from other articles of the same kind, and a second identifier created using the first identifier and a cryptographic key; where the first identifier and the second identifier are both readable by a camera of a mobile computing device. The first identifier and the second identifier may be visible to a human eye. The at least partially random feature may include a two-dimensional portion of a surface of the article of manufacture. At least a portion of the first identifier may include a three-dimensional feature of the article of manufacture. The at least partially random feature may result from the introduction of at least one coloring agent during manufacture of the article. The second identifier may include a digital certificate and the digital certificate may include a window defined therein through which the first identifier is visible. The second identifier may be applied to the surface of the article of manufacture. The second identifier includes information to determine the location of the first identifier on the article of manufacture. The first identifier may be defined by a boundary on the surface of the article of manufacture, and the second identifier may be located on the surface of the article of manufacture outside the boundary. The article of manufacture may include a first surface and a second surface spaced from the surface, where the first identifier may be located on the first surface and the second identifier may be located on the second surface. The second identifier may include a bar code identifier and the first identifier may include a non-bar code identifier. The second identifier may include at least one of a two-dimensional bar code, a matrix bar code, and a three-dimensional bar code.

In addition, according to at least one aspect of this disclosure, a method for marking an item of a manufactured product to prevent counterfeiting of the item includes introducing an at least partially random visual feature that cannot be economically duplicated to the item during manufacture of the item, defining a first identifier to uniquely distinguish the item from other items of the manufactured product and from other products, where the first identifier includes a two-dimensional portion of the at least partially random visual feature that is readable by a camera of a mobile computing device, generating a computer-readable image of the first identifier, generating a second identifier based on the computer-readable image of the first identifier and a first cryptographic key associated with a manufacturer of the item, and applying the second identifier to at least one surface of the item. The method may include determining a location of the first identifier on the item and including information relating to the location of the first identifier in the second identifier. The method may include defining a plurality of first identifiers, selecting one of the plurality of first identifiers, and generating the second identifier based on a computer-readable image of the selected first identifier. The method may include defining a plurality of first identifiers and generating the second identifier based on the plurality of first identifiers. The method may include generating a digital fingerprint from the computer-readable image of the first identifier and applying an error correction technique to the digital fingerprint. The method may include introducing at least one coloring agent during manufacture of the item to create the at least partially random feature.

Further, according to at least one aspect of this disclosure, a method of determining the authenticity of an item of a manufactured product using a mobile computing device includes at a mobile computing device, receiving a digital image of at least an authenticating portion of the item created with a camera of the mobile computing device, analyzing digital representations of a first identifier and a second identifier derived from the digital image, where the first identifier includes an at least partially random visual feature that cannot be economically duplicated, results from manufacture of the item and is defined to uniquely identify the item, and the second identifier is cryptographically related to the first identifier, and determining whether the item is authentic to the manufacturer based on the digital representations of the first and second identifiers and using a cryptographic key stored at the mobile computing device. The method may include determining whether the item is authentic to the manufacturer without accessing data that is remote from the mobile computing device. The second identifier may include a digital signature created using the first identifier. The method may include verifying the digital signature using the cryptographic key. The second identifier may include information relating to at least one of the item, the manufactured product, and the manufacturer of the item. The method may include displaying an indication of whether the item is authentic and the information relating to at least one of the item, the manufactured product, and the manufacturer of the item at the mobile computing device.

Additionally, according to at least one aspect of this disclosure, a computer-accessible storage medium includes a plurality of instructions executable by a personal mobile consumer electronic device to determine, from at least one digital image of an individual item of an article of manufacture created by a digital camera of the personal mobile consumer electronic device, digital representations of a first identifier and a second identifier, where the first identifier includes an at least partially random visual feature of the item that cannot be economically duplicated and is defined to uniquely identify the item, and the second identifier is cryptographically related to the first identifier. The instructions are executable to generate a first digital fingerprint from the digital representation of the first identifier, derive a second digital fingerprint and a digital signature from the digital representation of the second identifier, determine whether the item is authentic to a manufacturer based on the first digital fingerprint, the second digital fingerprint, the digital signature, and a cryptographic key stored at the personal mobile consumer electronic device, display information relating to at least one of the item, the product, the manufacturer, and a person associated with the personal mobile consumer electronic device and the item, at the personal mobile consumer electronic device, in response to determining that the item is authentic to the manufacturer, and output, in a human-perceptible form, at the personal mobile consumer electronic device, an indication that the item is not authentic, in response to determining that the item is not authentic to the manufacturer. The instructions may be executable by the personal mobile consumer electronic device to send information relating to usage of the item by a person associated with the personal mobile consumer electronic device to at least one remote computing device in response to determining whether the item is authentic to the manufacturer, and the at least one remote computing device may be associated with at least one of the manufacturer, a supplier of the manufactured product, a distributor of the manufactured product, a provider of a software application for managing or tracking information relating to items of the manufactured product, and a provider of a software application for managing or tracking information relating to use of the item by one or more persons. The instructions may be executable by the personal mobile consumer electronic device to associate information relating to the item with information relating to a geographic location of the personal mobile consumer electronic device and send the item and geographic location information to the at least one remote computing device. The instructions may be executable by the personal mobile consumer electronic device to display, at the personal mobile consumer electronic device, a notification associated with the information relating to at least one of the item, the manufactured product, and the manufacturer, in response to determining that the item is authentic to the manufacturer. The instructions may be executable by the personal mobile consumer electronic device to determine a status of the item based on the information relating to at least one of the item, the manufactured product, and the manufacturer and generate the notification based on the status of the item.

Further, according to at least one aspect of this disclosure, a system for protecting an item of a solid oral dosage form of a human drug product from counterfeiting includes at least one computing device configured to add an inactive ingredient during manufacture of the dosage form to generate, in a surface of the item, an at least partially random visual feature that cannot be economically duplicated, create a digital certificate from a first digital representation of the at least partially random visual feature and a first cryptographic key associated with a manufacturer of the item, apply an identifier embodying the digital certificate to the item so as not to obscure the at least partially random visual feature, analyze a second digital representation of the at least partially random visual feature, and authenticate the item based on the analyzed second digital representation and the digital certificate using a second cryptographic key associated with the manufacturer. The system may be configured to display information relating to authentication of the item at a personal mobile consumer electronic device. The system may be configured to send information relating to authentication of the item to at least one of a tracking system for tracking the location of counterfeit versions of the item and a usage monitoring system for monitoring usage of the item by one or more persons.

Additionally, according to at least one aspect of this disclosure, a solid oral dosage form of a human drug product includes a drug substance, an inactive ingredient added during manufacture of the dosage form to create, in at least one surface of the dosage form, a first identifier includes an at least partially random visual feature that cannot be economically duplicated, and a second identifier applied to at least one surface of the drug product so as not to obscure the first identifier, where the second identifier includes a code created using the first identifier and a cryptographic key, and the first identifier and the second identifier are both readable by a camera of a mobile computing device. The second identifier may include a digital signature generated by a certifying authority associated with a manufacturer of the dosage form. The second identifier may include information to determine a location of the first identifier on the dosage form. The first identifier may be located at a first location on a surface of the dosage form, the second identifier may be located at a second location on the surface of the dosage form, and the second location may be spaced from and substantially surrounds the first location. The dosage form may include a first surface and a second surface opposing the first surface, where the first identifier is located on the first surface and the second identifier is applied to the second surface. The at least partially random visual feature may include one or more human-ingestible coloring agents added during manufacture of the dosage form. The at least partially random visual feature may result from imperfectly blending or mixing the human-ingestible coloring agent(s) with the drug substance during manufacture of the dosage form. The at least partially random visual feature may result from applying the human-ingestible coloring agent(s) to at least one surface of the dosage form during manufacture of the dosage form.

Further, according to at least one aspect of this disclosure, a container to hold a plurality of items of the foregoing items includes a receptacle, a cover removably coupled to the receptacle, a window defined in at least one of the receptacle and the cover, and at least one retainer, wherein the window is configured to facilitate reading of the first identifier and the second identifier by the camera of the mobile computing device, and the retainer is configured to hold one of the items in a position to facilitate reading of the first identifier and the second identifier of the one item by the camera of the mobile computing device. The container may include a surface, where a third identifier relating to the dosage form is supported by the surface and the third identifier is derived at least in part from the first and second identifiers. A method of validating items of a solid oral dosage form of a human drug product using the foregoing container may include generating a first digital image of the third identifier, generating a second digital image of the first and second identifiers of one of the plurality of items through the window, and comparing the first and second digital images to validate the items.

Additionally, according to at least one aspect of this disclosure, a method for marking an item of a solid oral dosage form of a human drug product to prevent counterfeiting of the item includes introducing an inactive ingredient to create at least partially random visual feature that cannot be economically duplicated in a surface of the item during manufacture of the item, defining a first identifier to uniquely distinguish the item from other items of the same product and from other products, where the first identifier includes a two-dimensional portion of the at least partially random visual feature that is readable by a camera of a mobile computing device, generating a computer-readable image of the first identifier, generating a second identifier based on the computer-readable image of the first identifier and a first cryptographic key associated with a manufacturer of the item, and applying the second identifier to at least one surface of the item so as not to obscure the first identifier. The method may include determining a location of the first identifier on the item and may include information relating to the location of the first identifier in the second identifier. The method may include defining a plurality of first identifiers, selecting one of the plurality of first identifiers, and generating the second identifier based on a computer-readable image of the selected first identifier. The method may include defining a plurality of first identifiers and generating the second identifier based on the plurality of first identifiers. The method may include generating a digital fingerprint from the computer-readable image of the first identifier and applying an error correction technique to the digital fingerprint. The method may include introducing one or more human-ingestible coloring agents during manufacture of the item to create the at least partially random visual feature.

In addition, according to at least one aspect of this disclosure, a method of determining the authenticity of an item of a solid oral dosage form of a human drug product using a mobile computing device includes at a mobile computing device receiving a digital image of at least an authenticating portion of the item created with a camera of the mobile computing device, where the digital image includes a digital representation of a first identifier includes an at least partially random visual feature of a surface of the item that cannot be economically duplicated and is defined to uniquely identify the item and a digital representation of a second identifier cryptographically related to the first identifier, analyzing the digital representations of the first and second identifiers derived from the digital image, and determining whether the item is authentic to a manufacturer of the item based on the digital representations of the first and second identifiers and using a cryptographic key associated with the manufacturer and stored at the mobile computing device. The method may include determining whether the item is authentic to the manufacturer without accessing data that is remote from the mobile computing device. The second identifier may include a digital signature created using the first identifier. The method may include verifying the digital signature using the cryptographic key. The second identifier may include information relating to at least one of the item, the manufactured product, and the manufacturer of the item. The method may include displaying an indication of whether the item is authentic and the information relating to at least one of the item, the dosage form, and the manufacturer of the item at the mobile computing device.

Further, according to at least one aspect of this disclosure, a computer-accessible storage medium includes a plurality of instructions executable by a personal mobile consumer electronic device to determine, from at least one digital image of an individual item of a solid oral dosage form of a human drug product created by a digital camera of the personal mobile consumer electronic device, digital representations of a first identifier and a second identifier, where the first identifier includes an at least partially random visual feature of the item that cannot be economically duplicated and is defined to uniquely identify the item, and the second identifier is cryptographically related to the first identifier, generate, from the digital representation of the first identifier, a first digital fingerprint, derive, from the digital representation of the second identifier, a second digital fingerprint and a digital signature, determine whether the item is authentic to a manufacturer based on the first digital fingerprint, the second digital fingerprint, the digital signature, and a cryptographic key stored at the personal mobile consumer electronic device, display information relating to at least one of the item, the dosage form, the manufacturer, and a person associated with the personal mobile consumer electronic device and the item, at the personal mobile consumer electronic device, in response to determining that the item is authentic to the manufacturer, and output, in a human-perceptible form, at the personal mobile consumer electronic device, an indication that the item is not authentic, in response to determining that the item is not authentic to the manufacturer. The instructions may be executable by the personal mobile consumer electronic device to send information relating to usage of the item by a person associated with the personal mobile consumer electronic device to at least one remote computing device in response to determining whether the item is authentic to the manufacturer, and the at least one remote computing device may be associated with at least one of the manufacturer, a supplier of the dosage form, a distributor of the dosage form, a provider of a software application for managing or tracking information relating to items of the dosage form, and a provider of a software application for managing or tracking information relating to use of the dosage form by one or more persons. The instructions may be executable by the personal mobile consumer electronic device to associate information relating to the item and information relating to a geographic location of the personal mobile consumer electronic device and send the item and geographic location information to the at least one remote computing device. The instructions may be executable by the personal mobile consumer electronic device to display, at the personal mobile consumer electronic device, a notification associated with the information relating to at least one of the item, the dosage form, and the manufacturer, in response to determining that the item is authentic to the manufacturer. The instructions may be executable by the personal mobile consumer electronic device to determine a status of the item based on the information relating to at least one of the item, the manufactured product, and the manufacturer and generate the notification based on the status of the item. The plurality of instructions may be executable by the personal mobile consumer electronic device to display, at the personal mobile consumer electronic device, information relating to at least one of an expiration date of the item and a prescription associated with the item and the person associated with the personal mobile consumer electronic device, in response to determining whether the item is authentic to the manufacturer.

BRIEF DESCRIPTION OF THE DRAWINGS

Aspects of this disclosure are illustrated by way of example and not by way of limitation in the accompanying figures. The figures may, alone or in combination, illustrate one or more embodiments of various aspects of this disclosure. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

FIG. 3 is a simplified flow diagram for at least one embodiment of a method for analyzing a digital image of an item of a manufactured product;

FIG. 4 is a simplified flow diagram for at least one embodiment of a method for authenticating an item of a manufactured product and managing information relating to the item and/or use of the item by one or more persons;

DETAILED DESCRIPTION OF THE DRAWINGS

Figure 1:
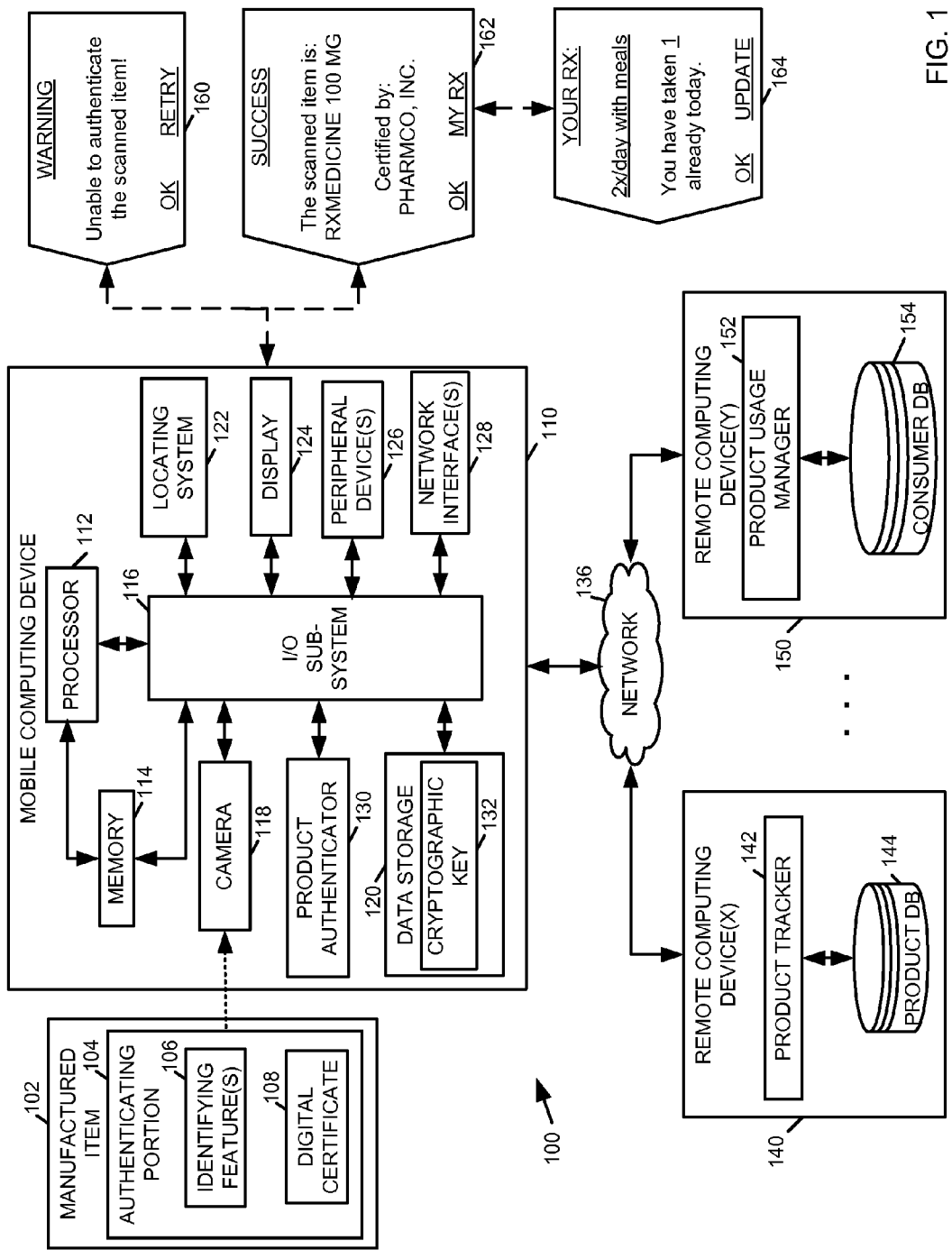
FIG. 1 is a simplified block diagram of at least one embodiment of a system for authenticating an item of a manufactured product using a mobile computing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details are set forth in order to provide a more thorough understanding of the present disclosure. It will be appreciated, however, by one skilled in the art that embodiments of the disclosure may be practiced without such specific details. In some instances, details such as control structures and full software instruction sequences have not been shown in order not to obscure the invention. Those of ordinary skill in the art, with the included descriptions, will be able to implement appropriate functionality without undue experimentation.

References in the specification to "one embodiment," "an embodiment," "an illustrative embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions carried by or stored on a transitory or non-transitory machine-readable medium, which may be read and executed by one or more processors. A machine-readable medium may be embodied as any device, mechanism or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and/or others.

In the drawings, specific arrangements or orderings of schematic elements, such as those representing devices, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, irrespective of the terminology used in the drawings or description (which may be selected for ease of discussion or other reasons), schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, Ruby, C, C++, C#, a combination of any of these, and/or other programming languages.

Similarly, schematic elements used to represent data or information may be implemented using any suitable electronic arrangement or data structure, such as a database, data store, table, record, array, index, hash, map, tree, list, graph, file (of any file type), folder, directory or other grouping of files, header, web page, meta tag, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association exists. In other words, some connections, relationships or associations between elements may not be shown in the drawings so as not to obscure the invention. Also, for ease of illustration, a single connecting element may be used to represent multiple connections, relationships or associations between elements. For example, where a connecting element represents a communication of signals, data or instructions, it should be understood by those skilled in the art that such element may represent one or multiple signal paths, as may be needed, to effect the communication.

In some industries, it can be important or desirable for a consumer, end customer, or other participant in the supply chain to be able to easily and reliably determine the authenticity of a manufactured product prior to, during, or after purchase, e.g., at or near the point of sale, wherever that may be. Referring now to FIG. 1, an illustrative system 100 for authenticating an individual item of a manufactured product is embodied in a mobile computing device 110. The illustrative mobile computing device 110 can be used by a consumer, end customer, or other participant in the supply chain, for example, to identify a manufactured item 102 and find out whether it is authentic, simply by taking a digital picture of an authenticating portion 104 of the item 102 using a camera 118 of the mobile computing device 110. Once the picture is taken, a product authenticator application 130 installed on the mobile computing device 110 analyzes the digital picture and uses a cryptographic technique to determine whether the item 102 is authentic; that is, whether the item 102 is actually what it purports to be and whether it has been certified as authentic by a trusted party, such as a known manufacturer of the product. The illustrative product authenticator application 130 does not need to access any remote databases to make this determination (although it could do so). Therefore, authentication can be performed at the mobile computing device 110 notwithstanding any technological limitations of the geographic area in which the mobile computing device 110 may be located (e.g., lack of access to a wireless communication network).

As one example, consumers can obtain dosage forms (e.g., pills, tablets, capsules, etc.) of human or animal drug products (e.g., prescription, over-the-counter, biological, and homeopathic drug products, dietary supplements, and/or others) from a variety of sources other than traditional brick-and-mortar pharmacies (such as online or mail-order 'pharmacies,' and nutrition or fitness outlets, for example). In some cases, it may be relatively easy or inexpensive for a counterfeiter to create fake drugs that are virtually indistinguishable from the real product in shape, size, color, and labeling, such that even a supplier or distributor may be fooled, let alone the end customer. Equipping mobile electronic devices, including even relatively simple or unsophisticated consumer-oriented devices, with the product authenticator application 130 can enhance anti-counterfeiting efforts at various points in the supply chain.

Referring still to FIG. 1, when the manufactured item 102 is photographed by the camera 118, a digital image of at least the authenticating portion 104 of the item 102 is stored in memory (e.g., the data storage 120) at the mobile computing device 110. As described in further detail below, the illustrative product authenticator 130 obtains, from the digital image of the authenticating portion 104, a digital representation of a an identifying feature (e.g., bar code), which embodies a digital certificate 108 associated with the manufactured item 102, and a digital representation of an identifying feature 106 of the manufactured item 102. The product authenticator 130 generates a digital fingerprint$_1$ from the digital representation of the identifying feature 106 created by the camera 118. The product authenticator 130 also derives a digital signature and a digital fingerprint$_2$ from the digital representation of the identifying feature embodying the digital certificate 108, created by the camera 118. The product authenticator 130 uses the digital signature and the digital fingerprint$_2$ obtained from the digital certificate 108 and the digital fingerprint$_1$ generated from the digital representation of the identifying feature 106 to verify the identity of the item 102 and determine whether the item 102 is authentic to a certifying authority (e.g., a known manufacturer of the item 102).

In general, the identifying feature 106 of the manufactured item 102 is defined to include an at least partially random feature of the item 102 that is produced from the manufacture of the item 102, which arises from a stochastic process and cannot be economically duplicated by either the manufacturer of the item 102 or a would-be counterfeiter, and therefore can serve to uniquely identify the physical item 102. The identifying feature 106 may be a visual feature (e.g., perceptible by the human eye and/or a digital camera under normal lighting conditions) or a non-visual feature (e.g., detectable with the aid of other, non-visible forms of electromagnetic radiation such as ultraviolet or infrared radiation, or with the aid of vibration energy such as ultrasound). The item 102 may have more than one identifying feature 106, but that term is used in the singular form here for ease of discussion.

Figure 5:
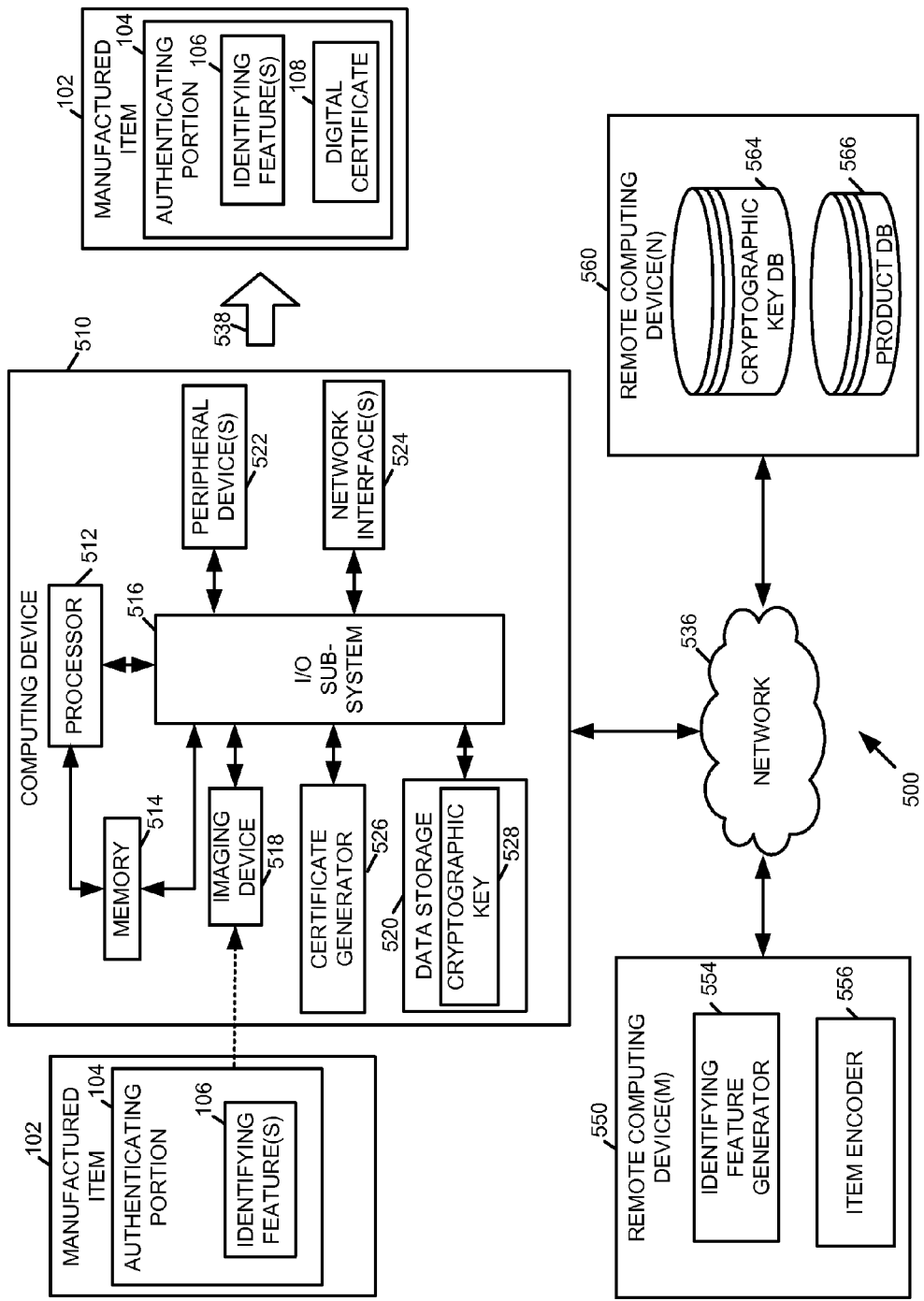
FIG. 5 is a simplified block diagram of at least one embodiment of a system for encoding an individual item of a manufactured product with an identifier that is configured to be uniquely associated with the item and the item's manufacturer.
Figure 10:
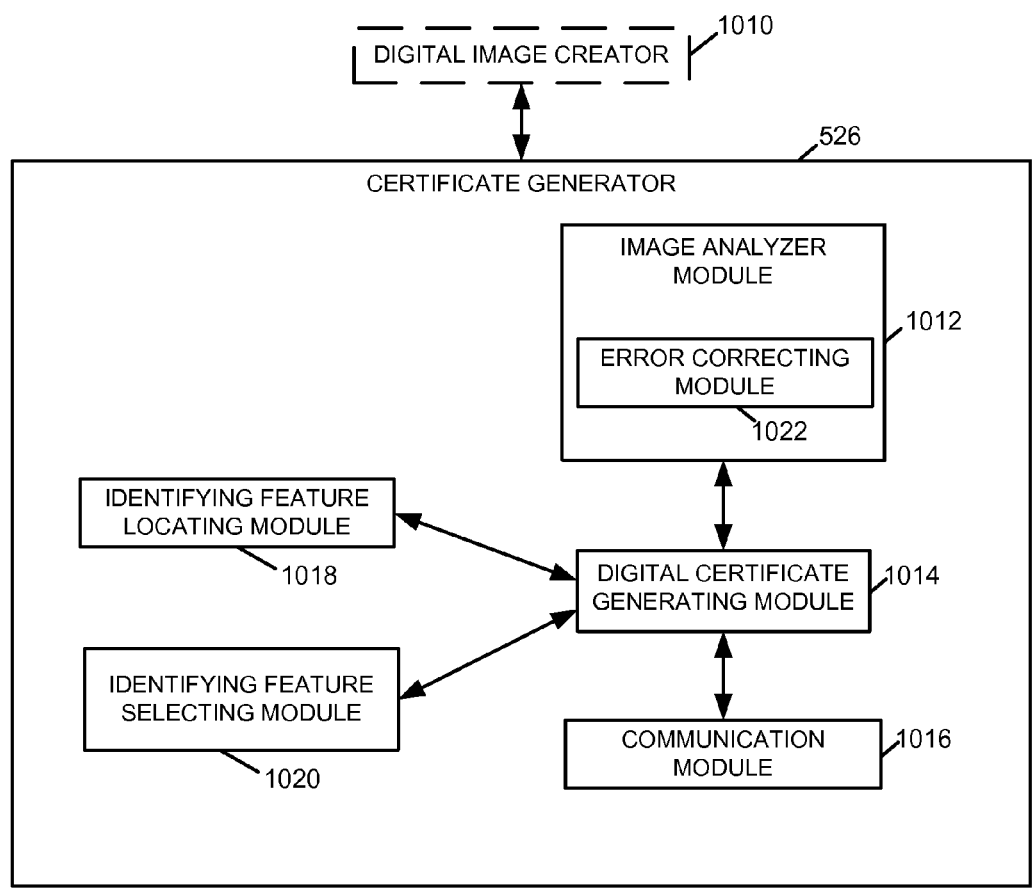
FIG. 10 is a simplified module diagram illustrating aspects of at least one embodiment of the system of FIG. 5.
Figure 11:
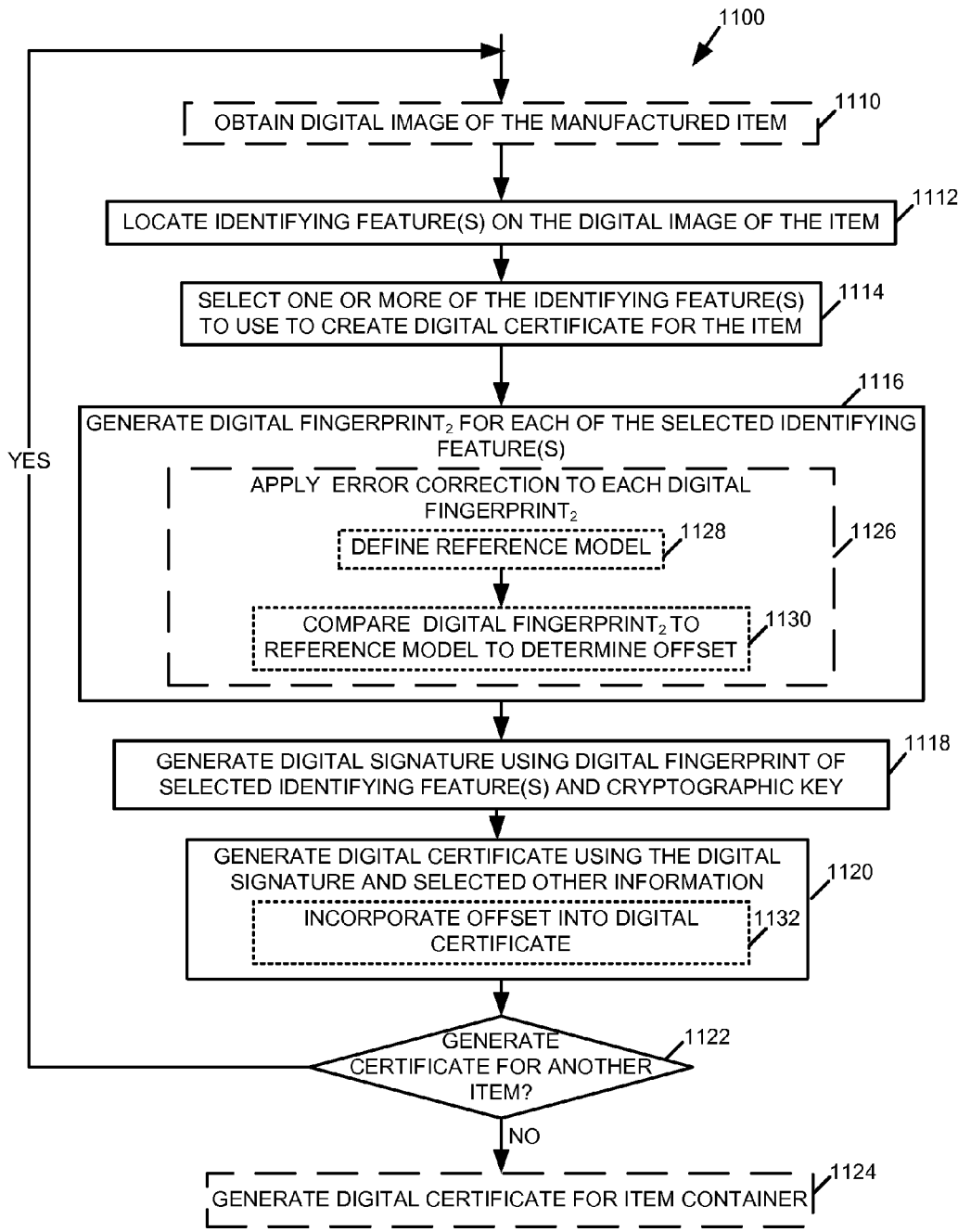
FIG. 11 is a simplified flow diagram of at least one embodiment of a method for generating an identifier that is configured to be uniquely associated with a manufactured item and the item's manufacturer.
Figure 12:
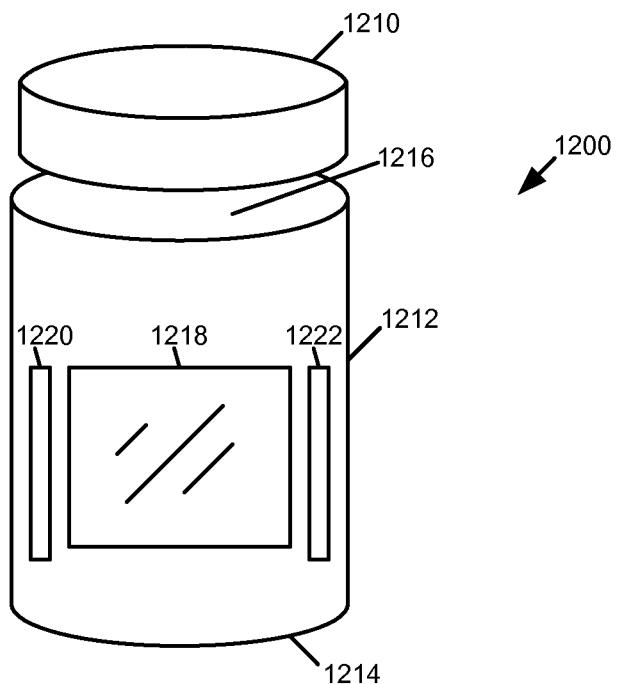
FIGS. 12-13 are simplified perspective views of a container for items encoded with an identifier that is configured to be uniquely associated with the item and the item's manufacturer.
Figure 13:
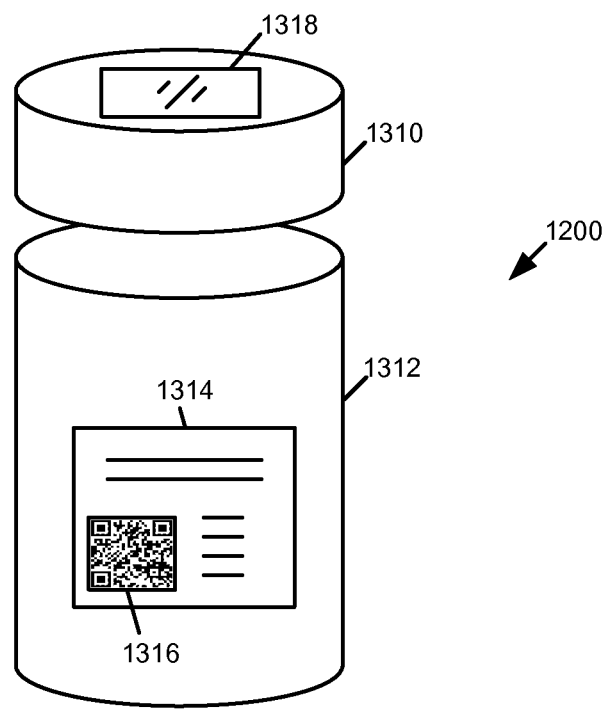

As explained below, the digital signature derived from the digital certificate 108 is originally generated using the digital fingerprint$_2$ of the identifying feature 106 and a cryptographic key 528 (FIG. 5). The digital fingerprint$_2$ and the cryptographic key 528 are generated or provided by a trusted certifying authority (such as the manufacturer of the item 102) prior to the creation of the digital certificate 108. A system 500 for encoding a manufactured item with an identifying feature 106 and an identifier embodying the digital certificate 108 is illustrated in FIGS. 5 and 10-11 and described below. FIGS. 6-9 described below illustrate a few examples of a manufactured item that has on at least one surface thereon one or more identifying features and an identifier embodying a digital certificate. FIGS. 12-13 illustrate an example of a container and/or lid that is designed to facilitate viewing of an identifying feature and/or identifier that embodies a digital certificate of a manufactured item, while the item is held in the container.

As shown by the exemplary user interfaces 160, 162, 164, which can be displayed on a display 124 of the mobile computing device 110, the product authenticator 130 informs the user of the mobile computing device 110 as to whether the item 102 has or has not been successfully authenticated based on the digital image of the authenticating portion 104 obtained by the camera 118. More specifically, the illustrative product authenticator 130 not only identifies the item 102 as being of a particular kind of product (e.g., what is it?), but can also identify the certifying authority associated with the item (e.g., the manufacturer of the particular item 102), if the item is authenticated. If the product authenticator 130 is unable to successfully authenticate the item 102, the user of the mobile computing device 110 is alerted and may be prompted to retry the authentication (e.g., by taking another picture of the item 102), as shown by the illustrative user interface 160. If the product authenticator 130 successfully authenticates the item 102, information about the item and/or its use may be presented to the user, as shown by the illustrative user interfaces 162, 164. In either case; that is, whether or not the authentication is successful, the product authenticator 130 may report the authentication information to one or more remote computer systems, which may include, for example, a product tracking system 142, a product database 144, a product usage manager 152, and/or a consumer database 154, as described below.

For instance, in the dosage form example, successful and/or unsuccessful authentication attempts may be reported to a computer system used by a manufacturer of the item 102 to monitor the distribution of its dosage forms and identify the location of potential counterfeits. If the item 102 is successfully authenticated, the product authenticator 130 may interface with a pharmacy system or medication reminder system, for example, to retrieve additional details about the user's relationship with the dosage form (e.g., prescription or purchase details), or to update the user's records relating to his or her usage of the dosage form (e.g., in relation to the prescribed use). If the authentication is not successful, the product authenticator 130 may associate geographic location information obtained from the locating system 122 with the authentication attempt and send the geographic location and item information to the product tracker 142, to facilitate the tracking of potential counterfeit products or for other reasons.

As another example, in some embodiments, the product tracker 142 may be configured for use prior to the purchase of the item 102. In such a "pre-purchase" mode, the user of the mobile computing device 110 uses the camera 118 to create a digital image of the item. Upon detecting the image, or on initiation by the user, the product authenticator 130 analyzes the digital image and attempts to authenticate the item as described herein. If the item 102 is authenticated, the product tracker 142 may display (e.g., at the display 124) the name of the product, the name of the manufacturer, the manufacturer's suggested retain price, and/or other information associated with the item 102 and/or the manufacturer. In the dosage form example, the information displayed may include the name of the medication, expiration date, and/or expected quantity (e.g., in a particular package type). Also, once the item 102 is authenticated, the product tracker 142 and/or the product usage manager 152 may prompt the user of the mobile computing device 110 to fill out warranty registration information, to input other information relating to the item 102, the user, or the anticipated use of the item 102, or to perform other actions.

In the dosage form example and/or others involving ingestible products, the product usage manager 152 may have a "consumption mode," in which the user's intake of the item 102 can be recorded at the mobile computing device 110. In such a consumption mode, the product usage manager 152 may access information about the user's prescription, nutrition plan, or dietary regimen, for example, which may be obtained from the consumer database 154. Based on this information, the product usage manager 152 may, among other things, alert the user when it is time to take a dose of medication, warn the user if he or she has already taken the prescribed amount for the day, or notify the user that the prescription needs to be refilled. Further, the product usage manager 152 may prompt the user to authenticate an individual item 102 prior to consumption, so that it may advise the user if the item may not be authentic (this may occur if, for example, the product usage manager 152 has already authenticated an item with the same serial number).

The illustrative mobile computing device 110 is embodied as an electronic device that has a digital camera and computing capabilities. In general, the mobile computing device 110 is configured to be carried by a person. For example, the mobile computing device 110 may be embodied as a cellular phone, a camera phone, a smartphone, or other mobile phone device, a mobile Internet device, a handheld, laptop or tablet computer, an e-reader, a personal digital assistant, a telephony device, a netbook, a digital camera, a portable media player or recorder, augmented reality glasses, or any other commodity mobile device, personal mobile consumer electronic device or portable electronic device that includes a camera capable of capturing still and/or video images and a display.

As shown in FIG. 1, the mobile computing device 110 includes at least one processor 112 in communication with an input/output (I/O) subsystem 116. The illustrative processor 112 may include one or more processor cores (e.g. microprocessors). The I/O subsystem 116 may include, among other things, an I/O controller, a memory controller, and one or more I/O ports (not shown). The processor 112 and the I/O subsystem 116 are communicatively coupled to a memory 114. The memory 114 may be embodied as any type of suitable memory device, such as a dynamic random access memory device (DRAM), synchronous dynamic random access memory device (SDRAM), double-data rate dynamic random access memory device (DDR SDRAM), and/or other volatile memory device.

The illustrative I/O subsystem 116 is communicatively coupled to the camera 118, the product authenticator 130, at least one data storage 120, a locating system 122, the display 124, one or more peripheral devices 126, and one or more network interfaces 128.

The illustrative camera 118 is embodied as a digital camera or other digital imaging device that is integrated with the mobile computing device 110. Generally speaking, the camera 118 includes an electronic image sensor, such as an active-pixel sensor (APS), e.g., a complementary metal-oxide-semiconductor (CMOS) sensor, or a charge-coupled device (CCD). No particular minimum image resolution is required of the camera 118; that is, the image resolution provided by low-end or standard camera phones, as well as that of more sophisticated devices, is suitable for the purposes of the present disclosure. However, the higher the resolution of the camera 118 and/or the quality of its included lenses and/or image processing software, the more difficult it should be for a would-be counterfeiter to copy an image from one item to another in an undetectable manner. Thus, in some embodiments, it may be preferable to use the highest resolution, best lenses, and/or best image processing software that are available in a mobile computing device 110 or similar commodity mobile devices or personal mobile consumer electronic devices. Further, although the illustrative embodiment captures digital images using a camera, it should be understood that in some embodiments, any sensor (or combination of sensors) integrated with the mobile computing device 110 and capable of measuring identifying feature(s) 106; for example, video or audio sensors may be used to generate digital representations of the identifying feature 106. In some embodiments, the camera 118 and/or one or more other sensors of the mobile computing device 110 are sensitive to non-visible forms of radiation, such as ultraviolet or infrared radiation, and therefore are capable of capturing digital images of identifying features that are not visible to the human eye. Thus, the mobile computing device 110 may, or may be adapted to, capture non-visual images as a result of a hardware design (e.g., by adding or removing physical filters) or through the use of camera software that enables the capture of non-visual images.

The illustrative product authenticator 130 is embodied as one or more computer-executable instructions, routines, programs, processes, or the like (e.g., software, firmware, or a combination thereof). At various times, all or portions of the product authenticator 130 may be embodied in one or more computer-accessible storage media (e.g., the memory 114, the data storage 120, a firmware device such as flash memory, and/or other storage media) of the mobile computing device 110.

The illustrative data storage 120 is embodied as one or more computer-accessible storage media, such as one or more disk storage devices (e.g., hard disks) or other suitable data storage devices (e.g., memory cards, memory sticks, and/or others). While not specifically shown, it should be appreciated that portions of the product authenticator 130 and/or the locating system 122 may reside in the data storage 120, in some embodiments, and may be copied to the memory 114 during operation, for faster processing or other reasons.

In the illustrative embodiment, at least one cryptographic key 132 resides in the data storage 120. For example, the cryptographic key 132 may be obtained when the product authenticator 130 is installed (e.g., downloaded) on the mobile computing device 110. The illustrative cryptographic key 132 is configured to serve as an input to a cryptographic algorithm that is executable by the product authenticator 130. In some embodiments, the cryptographic key 132 is a public key configured for use in a public key-private key digital signature scheme, and is part of a public key-private key pair issued by a certifying authority (e.g., the manufacturer of the item 102). Some illustrative cryptographic key schemes or techniques that may be used include RSA (Rivest-Shamir-Adleman), DSS (Data Security Standard) (e.g., as specified in the 2009 standard Federal Information Processing Standards (FIPS) 186-3), or other factoring based approaches; the ElGamal encryption system or other discrete log based approaches; elliptic curve based approaches; or lattice based approaches. However, as should be appreciated by those skilled in the art, any suitable cryptographic key scheme or technique may be used, taking into consideration the requirements or design of a particular embodiment of the system 100.

The illustrative locating system 122 may be embodied as computerized instructions, routines, programs, processes, or the like (e.g., software, firmware, or a combination thereof) that are configured to determine and/or monitor the geographic location of the mobile computing device 110 (e.g., relative to absolute coordinates such as longitude and latitude), using, for example, a cellular location-based service (LBS) or a global positioning system (GPS). In some embodiments, the locating system 122 includes a GPS receiver. Further, in some embodiments, a GPS receiver may be integrated with the camera 118 so that digital images created with the camera 118 can be tagged with information indicating the geographic location of the mobile computing device 110 at the time the digital image is created.

The display 124 may be embodied as a text, graphics, and/or video display screen, touch screen, or other suitable device for interacting with a user (e.g., to present warning indicators, notifications, and/or prompts such as shown by the illustrative user interfaces 160, 162, 164, and/or to accept user inputs).

The peripheral devices 126 may include, for example, a keyboard, keypad, touch screen, microphone, speaker, visual indicator (e.g., a light-emitting diode or LED), display (e.g., a liquid crystal display or LCD) or other suitable device for accepting input from or presenting output to a user (e.g., via user interfaces 160, 162, 164) at the mobile computing device 110. In some embodiments, the peripheral devices may include media players or recorders, GPS devices, graphics, sound and/or video adapters, and/or other devices, depending upon, for example, the intended use of the mobile computing device 110.

The illustrative network interface(s) 128 communicatively couple the mobile computing device 110 to one or more networks 136, which may include a local area network, wide area network, personal cloud, enterprise cloud, public cloud, and/or the Internet, for example. Accordingly, the network interface(s) 128 may include a wired or wireless Ethernet adapter, WIFI adapter or other suitable device as may be needed or desired, pursuant to the specifications and/or design of the particular network 136 and/or the mobile computing device 110.

The mobile computing device 110 may include other components, sub-components, and devices not illustrated in FIG. 1 for clarity of the description. Also, it should be understood by those skilled in the art that some of the illustrated components may not be required in some embodiments of the mobile computing device 110. For example, the locating system 122, the display 124, the peripheral devices 126, and/or the network interfaces 128 may not be required by some embodiments of the mobile computing device 110. In general, the components of the computing device 110 are communicatively coupled as shown in FIG. 1, by one or more signal paths, which are represented schematically as bidirectional arrows. Such signal paths may be embodied as any type of wired or wireless signal paths capable of facilitating communication between the respective devices.

The illustrative mobile computing device 110 communicates, via the network 136, with one or more remote computing devices(x) 140 and/or one or more remote computing devices(y) 150, where x and y can, respectively, have a value of zero or any positive integer. The remote computing devices 140, 150 may be embodied in or as any type of computing device or network of computing devices capable of performing at least the functions described herein as being performable by a computing device associated with a product tracking and/or product usage monitoring application, database, or service (e.g., those functions performed by the product tracker 142, the product database 144, the product usage manager 152, and the consumer database 154). For example, all or portions of the remote computing devices 140, 150 may be embodied in or as a desktop computer, an enterprise computer system, a network of computers, an Internet-enabled hosting service, or other electronic device, system, or combination of any of the foregoing, which is capable of facilitating the product tracking and/or product usage monitoring features described herein. In general, the remote computing devices 140, 150 include hardware components (e.g., processor, memory, I/O subsystem, data storage, communication circuitry, peripheral devices) similar or analogous to those described above in connection with the mobile computing device 110 or described below in connection with the computing device 510; therefore, those descriptions are not repeated here. Also, it should be understood that although shown separately in FIG. 1 for ease of discussion, the product tracker 142, product database 144, product usage manager 152, and consumer database 154 may reside on the same remote computing device or common remote computing devices 140, 150, in some embodiments.

For example, all or portions of the product tracker 142, the product database 144, the product usage manager 152 and/or the consumer database 154 may be local to a particular computing device 110, 140, 150, or may be distributed across multiple computing devices 110, 140, 150. In some embodiments, portions of the product tracker 142, the product database 144, the product usage manager 152 and/or the consumer database 154 may be installed on the mobile computing device 110, while other portions of the product tracker 142, the product database 144, the product usage manager 152 and/or the consumer database 154 may reside in one or more computer-accessible media (e.g., memory) on one or more remote servers (e.g. one or more physical or logical servers or storage devices accessible by multiple users), an Internet site (e.g. a server hosting a web page or web-based application), and/or other suitable locations depending on the type and/or configuration of the particular embodiment. For example, the product tracker 142, the product database 144, the product usage manager 152 and/or the consumer database 154 may be offered as a service by a third-party provider.

The network 136 may be embodied as any type of wireless telecommunications network. Portions of the network 136 may be embodied as or otherwise include one or more public or private cellular networks, telephone, Digital Subscriber Line (DSL) or cable networks, local or wide area networks, publicly available global networks (e.g., the Internet), or any combination thereof. For example, in some embodiments, the network 136 may be embodied as or otherwise include a Global System for Mobile Communications (GSM) cellular network. Additionally, the network 136 may include any number of additional devices as needed to facilitate communication between or among the mobile computing device 110 and the remote computing devices 140, 150, such as routers, switches, intervening computers and/or others. Any suitable communication protocol (e.g., TCP/IP) may be used to effect communication over the network 136, depending on, for example, the particular type or configuration of the network 136.

Figure 2:
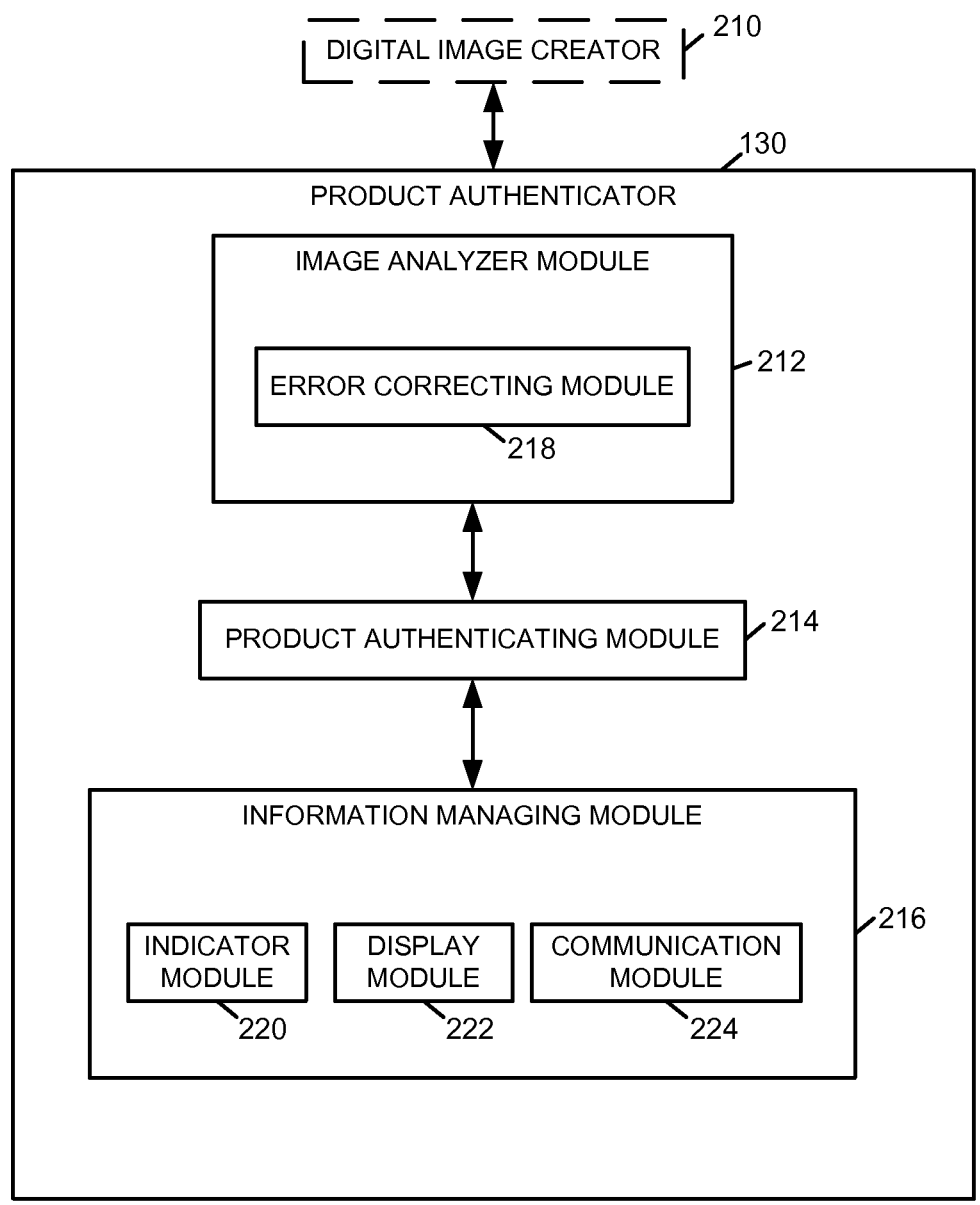
FIG. 2 is a simplified module diagram illustrating aspects of at least one embodiment of the system of FIG. 1.

Referring now to FIG. 2, modules of the illustrative product authenticator 130 are shown in greater detail. As mentioned above, the product authenticator 130 processes one or more digital images of at least the authenticating portion 104 (i.e., the identifying feature 106 and the identifier embodying the digital certificate 108) of the manufactured item 102, which are created by the camera 118. Accordingly, the product authenticator 130 interfaces with a digital image creator 210 of the camera 118 using any suitable (now known or later developed) method or technique, as should be understood by those skilled in the art. As it is not part of the product authenticator 130, but rather is a module that is typically a standard feature of the mobile computing device 110 (e.g., as part of the camera 118), the digital image creator 210 is illustrated with dashed lines.

The product authenticator 130 is configured to analyze one or more digital images of the authenticating portion 104 of the manufactured item 102, determine the identity of the item 102 and whether the item 102 is authentic as being associated with a certifying authority (e.g., the item manufacturer), communicate information relating to the identity of the item 102 and whether the item 102 is authentic to the user of the mobile computing device 110, and interface with one or more remote computing devices 140, 150. The illustrative product authenticator 130 includes an image analyzer module 212, a product authenticating module 214, and an information managing module 216.

The image analyzer module 212 processes the digital image of the authenticating portion 104 using any suitable (now known or later developed) image processing methods or techniques, as should be understood by those skilled in the art. As explained below, the image analyzer module 212 obtains and analyzes the digital representation of the identifying feature 106 and the identifier (e.g., bar code) embodying the digital certificate 108, which are derived from the digital image of the authenticating portion 104. The image analyzer module 212 obtains the digital fingerprint$_1$ from the digital representation of the identifying feature 106, and obtains the digital fingerprint$_2$ from the digital certificate 108. The illustrative image analyzer module 212 includes an error-correcting module 218, which may be used in the creation or analysis of the digital fingerprint$_1$ to allow the digital fingerprint$_1$ to accommodate variations in digital images that may occur as a result of the analog to digital conversion, camera angle, lighting conditions, and/or other factors. Further details of the operation of the image analyzer module 212 and the error-correcting module 218 are discussed below in connection with FIG. 3, which illustrates a method 300, portions of which are executable by the image analyzer module 212 and/or the error correcting module 218.

The illustrative product authenticating module 214 interfaces with the image analyzer module 212 to obtain the digital fingerprint$_1$ and the digital certificate 108. The product authenticating module 214 determines whether the digital fingerprint$_1$ corresponds to the identifying feature 106 of the item 102 and whether the digital signature from the digital certificate 108 is associated with a certifying authority (e.g., a manufacturer of the item 102). Further details of the operation of the product authenticating module 214 are discussed below in connection with FIG. 4, which illustrates a method 400, portions of which are executable by the product authenticating module 214.

The illustrative information managing module 216 interfaces with the product authenticating module 214 to obtain information relating to the authentication of the item 102. The information managing module 216 includes an indicator module 220, a display module 222, and a communication module 224, which interface, respectively, with one or more of the peripheral devices 126, the display 124, and the network interfaces 128, to output information relating to the authentication of the item 102 in a human-perceptible form at the mobile computing device 110, and/or to send information relating to item 102, the authentication of the item 102, and/or the user of the mobile computing device 110 to one or more of the remote computing devices 140, 150, and/or to obtain information from the user of the mobile computing device 110 and/or one or more of the remote computing devices 140, 150. Further details of the operation of the information managing module 216 are discussed below in connection with FIG. 4, which illustrates a method 400, portions of which are executable by the information managing module 216.

While the illustrative product authenticator 130 is configured to process one or more still digital images (e.g., digital photographs), it should be appreciated by those skilled in the art that alternative digital representations corresponding to the identifying feature 106 are possible. For example, some embodiments may process moving video images, sound recordings, or data from other sensors integrated with the mobile computing device 110. In particular, video images may be processed to measure an item's movement and thereby detect density variations in the item, and such density variations may be used as the identifying feature 106.

Referring now to FIG. 3, an illustrative method 300 for analyzing a digital image created by the camera 118 of at least an authenticating portion 104 (e.g., the identifying feature 106 and the digital certificate 108) of an individual item of a manufactured product is shown. The method 300 may be implemented as one or more computer-executable instructions, routines, processes or the like (e.g., software and/or firmware). At block 310, a person using the mobile computing device 110 takes a picture (e.g., a still image) of at least the authenticating portion 104 of the manufactured item 102 with the camera 118. As described in more detail below with reference to FIGS. 5-10, at least part of the authenticating portion 104 is visible to the human eye in the illustrative embodiments, and is therefore relatively easy for a person to photograph. However, as mentioned above, parts of the authenticating portion 104 may not be visible to the human eye in other embodiments, but some other visual feature of the item 102 (such as a logo or design) serves as an indicator to the user of where to focus the camera. For example, in some embodiments, no part of the authenticating portion 104 is visible to the human eye. In particular, for manufactured items such as jewelry, apparel, or other fashion accessories, the manufacturer may not desire visual interruption of the item 102's carefully designed outer appearance. Such embodiments may require the mobile computing device 110 to more automatically detect the authenticating portion 104 (e.g., using infrared or ultraviolet sensing). Block 310 is illustrated with dashed lines, to illustrate that it is not a step that needs to be performed by the product authenticator 130.

At block 312, the method 300 obtains a digital representation of the digital certificate 108 from the digital image taken by the camera 118. The digital certificate 108 includes the digital fingerprint$_2$ and a digital signature (e.g., bitstrings), which have been previously generated by the certifying authority (e.g., the manufacturer) at block 1116 of FIG. 11, described below. More specifically, the digital fingerprint$_2$ is generated by the certifying authority based on an identifying feature 106 of the item 102 that is selected by the certifying authority when the item 102 is encoded with the digital certificate 108 in the first place. The digital certificate 108 may contain other textual digital information that may be added by the certifying authority (such as serial number, batch number, expiration date, etc.) when the digital certificate 108 is created. For instance, the digital certificate 108 may include information that may be used by the error correcting module 214, as described below.

At block 314, the method 300 obtains the digital signature, the digital fingerprint$_2$, error-correcting information (e.g., an offset) as will be described below (if any), and/or other data it may need to compute, analyze, and/or verify the digital fingerprint$_1$. This may be simply a matter of reading plain text contained in the digital certificate 108 and/or interpreting a coded portion of the identifier embodying the digital certificate 108 (e.g., a bar code) using a suitable technique (now known or later developed), as should be appreciated by those skilled in the art. The digital signature, digital fingerprint$_2$, offset, and/or other information read from the digital certificate 108 are used to authenticate the item 102, as shown in FIG. 4 and described below.

At block 316, the method 300 computes the digital fingerprint$_1$ of the identifying feature 106 as captured in a digital image by the camera 118, which is the same identifying feature 106 as was selected by the certifying authority to create the digital fingerprint$_2$. There are many digital fingerprinting schemes that are publicly available, and any such scheme (whether now known or later developed) is suitable for purposes of the present disclosure, taking into consideration the requirements of a particular design or implementation of the system 100.

In general, a measurable characteristic of the identifying feature 106 is selected for use in creating the digital fingerprint. In the case of the digital fingerprint$_1$, the measurable characteristic is set by the certifying authority (i.e., the same measurable characteristic is used to create both the digital fingerprint$_1$ and the digital fingerprint$_2$). A defined area of the identifying feature 106 is selected over which to measure the measurable characteristic. A suitable feature extraction algorithm (now known or later developed) is applied to the defined measurement area to extract the measurable characteristic from the image and generate a bitstring (e.g., a string of binary digits) that can be used as a unique identifier of the item 102. As one example, the intensity of a certain pigment used in the manufacture of the item 102 may be selected as the measurable characteristic. As a result of the manufacturing process, the pigment intensity varies throughout the defined measurement area of the item 102 in a random, stochastic, chaotic, or otherwise unpredictable way. Measuring the pigment intensity throughout the measurement area creates a vector of pigment intensity values, where the length of the vector is defined by the number of measurement units in the measurement area (e.g., grid squares). A digital fingerprint can be created from this vector.

As explained further below with reference to FIG. 4, the digital fingerprint$_1$ is compared to the digital fingerprint$_2$ as part of the authentication process. If the item 102 as evaluated by the end user at the mobile computing device 110 is the same item that was encoded with the digital certificate 108 by the certifying authority, these digital fingerprints should match. However, since even relatively minor variations in the digital representations of the identifying feature 106 used to generate the digital fingerprints can cause the digital fingerprint$_1$ and the digital fingerprint$_2$ to differ, an error correction technique may be applied to the digital fingerprint$_1$ and/or the digital fingerprint$_2$ to reduce the risk of the product authenticator 130 incorrectly concluding that the item 102 is not authentic.

At block 318, one or more error correction methods or techniques may be applied to the digital fingerprint$_1$ generated at the mobile computing device 110, to eliminate some of the various inaccuracies and/or errors associated with extracting an image and generating a digital fingerprint, as discussed above. Of course, in some embodiments, no error correction may be needed (e.g., if the digital fingerprint$_1$ and the digital fingerprint$_2$ exactly match). One exemplary error correction technique involves using an error correction vector. In such an implementation, the offset between a reference model (e.g. integer lattice points in an N-dimensional real-valued space, or a subset of lattice points in a N-dimensional space, each dimension of which is isomorphic to the set of integers modulo some number) and the digital fingerprint$_2$ may be calculated, stored in an error correction vector, and included by the certifying authority (e.g., the manufacturer of the item 102) in the digital certificate 108, as described below in connection with blocks 1130 and 1132 of FIG. 11. At block 320, the error correction vector or offset may be applied (e.g., by the product authenticator 130) to the digital fingerprint$_1$. In some embodiments, applying the offset to the digital fingerprint$_1$ at block 320 may involve subtracting the offset given in the error correction vector from the digital fingerprint$_1$, rounding the values in the resulting vector to the nearest point in the reference model (e.g. a point in N-dimensional space where all coordinates are integers), and then adding the offset back to get a modified vector that accounts for the given offset and mitigates small errors or perturbations. This modified vector, or modified version of the digital fingerprint$_1$, may then be compared to the digital fingerprint$_2$, in order to determine whether the digital fingerprints match, and thus whether the item 102 is authentic to the certifying authority.

Another illustrative error correction technique involves comparing the digital fingerprint$_2$ directly with the digital fingerprint$_1$. To do so, the digital fingerprint$_2$, rather than an error correction vector or offset, can be included in the digital certificate 108 by the certifying authority. Alternatively, the certifying authority may store the digital fingerprint$_2$ in computer memory that is accessible to the mobile computing device 110. For instance, the digital fingerprint$_2$ may be stored in a database at a remote computing device (e.g., the product database 144 of the remote computing device 140), which can be accessed by the mobile computing device 110 via the network 136. The method 300 may then request the digital fingerprint$_2$ from the remote computing device (e.g., a server) to compare with the digital fingerprint$_1$.

In some embodiments, the certifying authority (e.g., manufacturer) may set acceptable tolerances for differences between the digital fingerprint$_1$ and the digital fingerprint$_2$, such that the digital fingerprint$_1$ is considered to match the digital fingerprint$_2$ if the difference between the two falls within the acceptable tolerance range set by the certifying authority.

Still another error correction technique involves discretizing the measurement values of the digital fingerprint$_1$ without using an offset. For instance, dividing and rounding the measurement values according to a pre-defined reference model (e.g., divide by 100, round to nearest integer) can be used to eliminate minor differences that otherwise would cause the digital fingerprints not to match.

Referring now to FIG. 4, an illustrative method 400 for authenticating an individual item of a manufactured product and communicating information relating to the item, the authentication, and/or a user of the mobile computing device 110, is shown. The method 400 may be implemented as one or more computer-executable instructions, routines, processes or the like (e.g., software and/or firmware). At block 410, the method 400 compares the digital fingerprint$_1$ (resulting from block 314 of FIG. 3) to the digital fingerprint$_2$ (which results from block 316 of FIG. 3) to verify the identity of the item 102, optionally using one or more error-correcting techniques as described above. As noted above, if the digital fingerprint$_1$ and the digital fingerprint$_2$ have been created using the same identifying feature 106, and the item 102 being evaluated by the end user at the mobile computing device 110 is the same as the item certified by the certifying authority, the comparison should be successful (taking into account the applicable error correcting techniques). In some embodiments, the method 400 may end here if the comparison fails.

At block 412, the method 400 attempts to verify that the digital signature obtained from the digital certificate 108 is valid as having originated with the certifying authority (e.g., a manufacturer of the item 102). To do this, the method 400 computes a secure hash value of the digital fingerprint$_1$ and other textual digital information derived from the digital certificate 108 (e.g., the additional alphanumeric text added by the manufacturer of the item 102), and applies a cryptographic algorithm to the digital signature using the cryptographic key 132.

To verify the digital signature, the method 400 compares the secure hash value to the output of the cryptographic algorithm at block 414. There are many cryptographic algorithms and secure hash functions that are publicly available. Thus, as should be appreciated by those skilled in the art, any suitable secure hash function and cryptographic algorithm may be used by the method 400, in accordance with the requirements of a particular design of the system 100. However, the cryptographic algorithm used at block 412 should correspond to the cryptographic algorithm that was previously used by the certifying authority to generate the digital signature at block 1118 of FIG. 11, as discussed in more detail below.

If the secure hash value does not correspond to the output of the cryptographic algorithm, then it can be inferred that the digital signature is not valid. In such event, at block 416 the method 400 outputs a warning indicator or notification. The warning indicator or notification may include a textual message, display of a graphic on a user interface, an audio (e.g., a 'beep' or tone) and/or visual indicator, and/or other human-perceptible indicator or notification, an example of which is shown by the user interface 160 of FIG. 1. At block 418, the method 400 prompts the user to retake the digital picture of the item 102. If the user responds in the affirmative, the method 400 returns to block 310 of FIG. 3. If the user opts not to retake the picture, then the method 400 proceeds to block 420.

At block 420, the method 400 can interface with one or more remote computing devices 140, 150, in some embodiments, to send data to one or more remote computer systems (e.g., the product tracker 142 or the product usage manager 152). Alternatively or in addition, in some embodiments, the method 400 may, at block 422, access item information and/or information about the user that is stored locally at the mobile computing device 110, in which case block 420 may be optional. As an example, if the item 102 is not authenticated, the method 400 may access data about the user and/or the item that is stored locally, in a remote product database 144, or in a remote consumer database 154, for example, to try to identify the item 102, and then, at block 424, send an alert to a manufacturer's computer system that a possible counterfeit has been detected. The alert may also include information about the geographic location of the mobile computing device 110, which may be obtained from the locating system 122.

As another example, if the item 102 is successfully authenticated, the method 400 may access data about the user and/or the item 102 that is stored locally, in a remote product database 144, or in a remote consumer database 154, and display that information at the mobile computing device 110 (e.g., user interfaces 162, 164).

Referring now to FIG. 5, an illustrative system 500 for encoding an individual item 102 of a manufactured product with a marking to uniquely identify the item 102 and its certifying authority (e.g., the item's manufacturer), to protect the item 102 from counterfeiting (or for other reasons), is shown. In the illustrative embodiments, the manufactured item 102 is a solid oral dosage form of a human drug product, such as a pill, tablet, capsule, or the like, of a prescription drug, over-the-counter drug, homeopathic remedy, biological drug product, herbal medicine product, vitamin, dietary supplement, or the like. However, in other embodiments, the manufactured item 102 may be a wristwatch, a piece of jewelry, a pair of sunglasses, a handbag, a piece of apparel, a fashion accessory, a luxury item or other high-margin consumer product, a consumer electronics device (e.g., a phone, camera, computer, media player, or media recorder), a battery, a pair of athletic shoes, sports equipment, entertainment media (e.g., compact discs, video discs, and/or software), office supplies (such as ink or toner cartridges), a replacement part for an automobile, vehicle, machinery, or appliance, or other manufactured product that may be susceptible to counterfeiting. For example, in some embodiments, the manufactured item 102 may be any product that contains a manufactured material or ingredient in or on which an identifying feature can be generated, including oral or non-oral solid dosage forms of human or animal drug products, polymers, plastics, ceramics, metals, fabrics, rubbers and other elastomers, paper, cardboard, or other packaging for a manufactured product, and/or others.

As described in more detail below, an identifying feature generator 554 manufactures the item 102 to include an authenticating portion 104, which contains one or more identifying features 106. A computing device 510 equipped with an imaging device 518 can create a digital image of the manufactured item 102, and more particularly, a digital image of the identifying feature(s) 106. The computing device 510 is configured with a certificate generator application 526, which can create a digital signature based on a digital representation of one or more of the identifying features 106 (e.g., the digital fingerprint$_2$), using a cryptographic key 528. The certificate generator 526 creates a digital certificate 108 that includes the digital signature and other information, as described below. An item encoder 556 adds an identifier (e.g., bar code) that embodies the digital certificate 108 to, or otherwise associates the digital certificate 108 with, the item 102.

Once the item 102 is encoded, its authenticating portion 104 includes both the identifying feature(s) 106 and the identifier (e.g., bar code) that embodies the digital certificate 108, as depicted by the arrow 538. In FIG. 5, the same reference numerals are used in both depictions of the manufactured item 102 to illustrate that, other than the addition of the identifier that embodies the digital certificate 108, the manufactured item 102 is essentially unchanged by the operation of the identifying feature generator 554, the certificate generator 526 and the item encoder 556.

The illustrative identifying feature generator 554 is a computerized component of an automated product manufacturing system. The identifying feature generator 554 is configured to control one or more steps in the process of manufacturing the item 102 so that the identifying feature(s) 106 are created in the item 102 during or as a result of that process. In some embodiments, the identifying feature generator 554 controls the introduction of an inactive ingredient, additive or other agent to create an at least partially random or stochastic visual feature in one or more surfaces of the item 102. For instance, the identifying feature generator 554 may control the timing, amount, duration, method, and/or other process parameter, of the introduction of one or more substances (such as one or more contrasting or coloring agents) to the item 102 during manufacture so as to create the at least partially random visual feature in or on at least one surface of the item 102. As one example, in embodiments where the item 102 is an uncoated pill or tablet, the identifying feature generator 554 may control the blending or mixing of one or more ingestible (e.g., edible) coloring agents (e.g., a Federal Food, Drug & Cosmetic Act or FD&C certified color additive, or a natural food dye) with other ingredients of the pill or tablet. As another example, in embodiments where the item 102 is a coated pill or tablet, or a capsule, the identifying feature generator 554 may control the blending or mixing of one or more ingestible coloring agents with the item's coating material, and/or the application of the coloring or mixed coating to the surface of the item 102. In other embodiments of the item 102 (e.g., non-ingestible products), similar techniques can be used to imperfectly add one or more coloring or contrasting agents to the item 102 to create the desired identifying feature, but without the requirement that the additive be ingestible. In still other embodiments, the identifying feature may be created as a normal or natural result of the manufacturing process, rather than the result of the introduction of a coloring agent or other substance specifically for this purpose. In addition, as should be understood by those skilled in the art, any suitable manufacturing techniques for creating an at least two-dimensional random, stochastic, and/or chaotic design, pattern, or other visually perceptible feature in or on at least one surface of the item 102 may be used. In addition, while a visual feature is mentioned in connection with the illustrative embodiments, in other embodiments, the at least partially random feature may include a portion that is not visible to the human eye, such as a portion that is only visible under infrared or ultraviolet light, and/or may include one or more transparent components such as sugar, salt, or another edible crystal, alone or in combination with any of the foregoing. Further, in some embodiments, the at least partially random feature may include a physical property of the item 102 other than appearance, such as the weight of the item 102, variations in density of the item 102, internal grains or grain boundaries, parting lines, and/or texture, cracks, or other irregularities in the shape or surface of the item 102.

As a result of the operation of the identifying feature generator 554, one or more identifying features 106 is created in or on at least one surface of the manufactured item 102. That is, in the illustrative embodiments, the identifying features 106 result from the manufacture of the item 102 (e.g., they do not occur naturally in the item 102). As alluded to above, the illustrative identifying features 106 include an at least partially random visual feature that is virtually non-reproducible (or at least not economically) due to its random qualities and the fact that it is part of the physical make-up of the manufactured item 102. Accordingly, the digital certificate 108 created therefrom and the resulting identifier embodying the digital certificate 108 should be unique to the item 102 and usable to distinguish the item 102 from other items of the same kind and from other products. For example, while it may be possible to copy the digital certificate 108 or identifier embodying the same, and apply it to another item (e.g., a counterfeit version of the item 102), authentication should fail at that point because the digital certificate 108 should not correspond to any identifying feature shown in a digital image of such other item.

In the illustrative system 500, the identifying feature generator 554 and the item encoder 556 are computerized applications that reside on one or more remote computing devices 550, which are in communication with the computing device 510 via a network 536. The computing device 510 is also in communication with one or more remote computing devices 560 via the network 536. The remote computing device(s) 560 house a cryptographic key database 564 and a product database 566, which may be accessed by the certificate generator 526 to create the digital certificate 108, as explained further below.

As shown in FIG. 5, the illustrative computing device 510 includes at least one processor 512 in communication with an input/output (I/O) subsystem 516. The illustrative processor 512 includes one or more processor cores (e.g. microprocessors). The I/O subsystem 516 may include, among other things, an I/O controller, a memory controller, and one or more I/O ports (not shown). The processor 512 and the I/O subsystem 516 are communicatively coupled to a memory 514. The memory 514 may be embodied as any type of suitable memory device, such as a dynamic random access memory device (DRAM), synchronous dynamic random access memory device (SDRAM), double-data rate dynamic random access memory device (DDR SDRAM), and/or other volatile memory device. The illustrative I/O subsystem 516 is communicatively coupled to an imaging device 518, the certificate generator 526, at least one data storage 520, one or more peripheral devices 522, and one or more network interfaces 524.

The illustrative imaging device 518 is embodied as a digital camera or other digital imaging device that is in communication with or incorporated into the computing device 510. In some embodiments, the camera 518 may include an electronic image sensor, such as an active-pixel sensor (APS), e.g., a complementary metal-oxide-semiconductor (CMOS) sensor, or a charge-coupled device (CCD). In other embodiments, the imaging device 518 may be embodied as a laser scanning device or other detection instrument. The image resolution of the imaging device 518 may be similar to or higher than that of the camera 118.

The illustrative certificate generator 526 is embodied as one or more computer-executable instructions, routines, programs, processes, or the like (e.g., software, firmware, or a combination thereof). At various times, all or portions of the certificate generator 526 may be embodied in one or more computer-accessible storage media (e.g., the memory 514, the data storage 520, a firmware device such as flash memory, and/or other storage media) of the computing device 510.

The illustrative data storage 520 is embodied as one or more computer-accessible storage media, such as one or more disk storage devices (e.g., hard disks) or other suitable data storage devices (e.g., memory cards, memory sticks, and/or others). While not specifically shown, it should be appreciated that portions of the certificate generator 526 may reside in the data storage 520, in some embodiments, and may be copied to the memory 514 during operation, for faster processing or other reasons.

In the illustrative embodiment, at least one cryptographic key 528 resides in the data storage 520. For example, the cryptographic key 528 may be obtained from the cryptographic key database 564 when the certificate generator 526 is installed on the computing device 510. The illustrative cryptographic key 528 is configured to serve as an input to a cryptographic algorithm that is executable by the certificate generator 526. In some embodiments, the cryptographic key 528 is a private key configured for use in a public key-private key digital signature scheme, and is therefore intended to be kept secret. The cryptographic key 528 is part of a public key-private key pair issued by a certifying authority (e.g., the manufacturer of the item 102). For instance, in some embodiments, the cryptographic key 528 is a private key that is used to create a corresponding public key (e.g., the cryptographic key 132), whereby the private key cannot be readily derived from the public key and vice versa, without additional information that is not readily known. As mentioned above, some illustrative cryptographic key schemes or techniques that may be used include RSA (Rivest-Shamir-Adleman), DSS (Data Security Standard) (e.g., as specified in the 2009 standard Federal Information Processing Standards (FIPS) 186-3), or other factoring based approaches; the ElGamal encryption system or other discrete log based approaches; elliptic curve based approaches; or lattice based approaches. However, as should be appreciated by those skilled in the art, any suitable cryptographic key scheme may be used, taking into consideration the requirements or design of a particular embodiment of the system 500 and/or the system 100.

The peripheral devices 126 may include, for example, a keyboard, keypad, touch screen, microphone, speaker, visual indicator (e.g., a light-emitting diode or LED), display (e.g., a liquid crystal display or LCD) or other suitable device for accepting input from or presenting output to a user at the computing device 510. In some embodiments, the peripheral devices may include graphics, sound and/or video adapters, and/or other devices, depending upon, for example, the intended use of the computing device 510.

The illustrative network interface(s) 524 communicatively couple the computing device 510 to one or more networks 536, which may include a local area network, wide area network, personal cloud, enterprise cloud, public cloud, and/or the Internet, for example. Accordingly, the network interface 524 may include a wired or wireless Ethernet adapter, WIFI adapter or other suitable device as may be needed, pursuant to the specifications and/or design of the particular network 536 and/or the computing device 510.

The computing device 510 may include other components, sub-components, and devices not illustrated in FIG. 5 for clarity of the description. Also, it should be understood by those skilled in the art that some of the illustrated components may not be required in some embodiments of the computing device 510. For example, the peripheral devices 522, and/or the network interfaces 524 may not be required by some embodiments of the computing device 510. In general, the components of the computing device 510 are communicatively coupled as shown in FIG. 5, by one or more signal paths, which are represented schematically as bidirectional arrows. Such signal paths may be embodied as any type of wired or wireless signal paths capable of facilitating communication between the respective devices.

The illustrative computing device 510 communicates, via the network 536, with one or more remote computing devices (m) 550 and/or one or more remote computing devices(n) 560, where m and n can, respectively, have a value of zero or any positive integer. The remote computing devices 550, 560 may be embodied in or as any type of computing device or network of computing devices capable of performing at least the functions described herein as being performable by a computing device associated with a identifying feature generating application (e.g., 554), an item encoding application (e.g., 556, a cryptographic key database (e.g., 564, and/or a product information database (e.g., 566). In general, the remote computing devices 550, 560 include hardware components (e.g., processor, memory, I/O subsystem, data storage, communication circuitry, peripheral devices) similar or analogous to those described above in connection with the mobile computing device 110 or the computing device 510; therefore, those descriptions are not repeated here.

All or portions of the computing devices 510, 550, 560 may be embodied in or as a desktop computer, an enterprise computer system, a network of computers, an Internet-enabled hosting service, or other electronic device, system, or combination of any of the foregoing, which is capable of facilitating the identifying feature generating, certificate generating, and/or item encoding features described herein. For instance, in some embodiments, one or more of the computing devices 510, 550, 560 or portions thereof may be embodied as a cellular phone, a camera phone, a smartphone, or other mobile phone device, a mobile Internet device, a handheld, laptop or tablet computer, an e-reader, a personal digital assistant, a telephony device, a netbook, a digital camera, a portable media player or recorder, or other commodity mobile device, personal mobile consumer electronic device or portable electronic device. Also, it should be understood that although shown separately in FIG. 5 for ease of discussion, all or any combination of the certificate generator 526, the identifying feature generator 554, the item encoder 556, the cryptographic key database 564, and the product database 566 may reside on the same computing device or common computing devices 510, 550, 560, in some embodiments.

For example, all or portions of the certificate generator 526, the identifying feature generator 554, the item encoder 556, the cryptographic key database 564, and the product database 566 may be local to a particular computing device 510. 550, 560, or may be distributed across multiple computing devices 510, 550, 560. In some embodiments, portions of the certificate generator 526, the identifying feature generator 554, the item encoder 556, the cryptographic key database 564, and the product database 566 may be installed on the computing device 510, while other portions of the certificate generator 526, the identifying feature generator 554, the item encoder 556, the cryptographic key database 564, and the product database 566 may reside in one or more computer-accessible media (e.g., memory) on one or more remote servers (e.g. one or more physical or logical servers or storage devices accessible by multiple users), an Internet site (e.g. a server hosting a web page or web-based application), and/or other suitable locations depending on the type and/or configuration of the particular embodiment. For example, any of the certificate generator 526, the identifying feature generator 554, the item encoder 556, the cryptographic key database 564, and the product database 566 may be offered as a service by a third-party provider.

The network 536 may be embodied as any type of wireless telecommunications network similar or analogous to the network 136 described above. Additionally, the network 536 may include any number of additional devices as needed to facilitate communication between or among the computing device 510 and the remote computing devices 550, 560, such as routers, switches, intervening computers and/or others.

Any suitable communication protocol (e.g., TCP/IP) may be used to effect communication over the network 536, depending on, for example, the particular type or configuration of the network 536.

Figure 6:
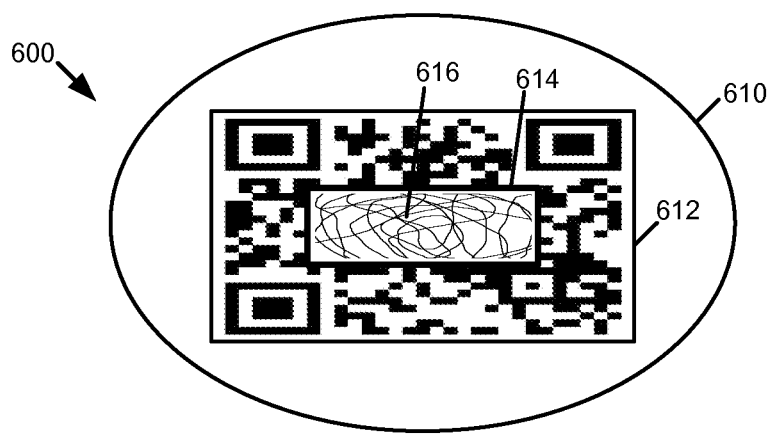
FIGS. 6-9 are simplified elevational views of embodiments of an item of a manufactured product encoded with an identifier that is configured to be uniquely associated with the item and the item's manufacturer.

Referring now to FIGS. 6-9, illustrative embodiments of an authenticating portion of an item 102 of a manufactured product are shown. Referring to FIG. 6, an authenticating portion 600 of the item 102 includes a surface 610. As a result of the operation of the identifying feature generator 554, the surface 610 includes an identifying feature 616, which, in the illustrative embodiment, includes a two-dimensional random, stochastic, or chaotic "swirl" pattern or design resulting from the introduction of one or more contrasting or coloring agents, such as an ink, colored powder, dye, or colored fiber, during manufacture of the item 102. While omitted from the drawings for clarity, it should be understood by those skilled in the art that other portions of the surface 610 may include similar features or be similarly patterned due to the introduction of the contrasting or coloring agent(s). Also, while the illustrative embodiment contemplates the deliberate introduction of one or more identifying agents to create the identifying feature 616, in these and/or other embodiments the identifying feature 616 may simply arise from stochastic variations occurring as part of the normal manufacturing process.

As explained further below, the certificate generator 526 analyzes a digital representation of the identifying feature 616 and defines a location of the identifying feature 616 on the surface 610 using, e.g., a coordinate system. In the embodiment of FIG. 6, the location of the identifying feature 616 is defined by a boundary 614, which also defines a window in the identifying feature 612 through which the identifying feature 616 can be viewed. The boundary 614 can define the measurement area for digital fingerprinting purposes. The certificate generator 526 interprets the digital representation of the identifying feature 616 to create a digital fingerprint as described above, generates the digital certificate, and incorporates the digital certificate into the identifying feature 612. In some embodiments, the certificate generator 526 determines a location (e.g., coordinates) on the surface 610 at which identifying feature 612 can be applied without obscuring the identifying feature 616. In the embodiment of FIG. 6, the location of the identifying feature 612 is defined to substantially surround but not interfere with the identifying feature 616 In the illustrative embodiments, the identifying feature 612 is embodied as a two-dimensional human readable code, such as a bar code or matrix bar code, which is visible to a human eye and detectable by a camera of a mobile computing device (e.g., device 110), and embodies the digital certificate. However, in other embodiments, the identifying feature 612 and/or similar identifying features described herein as embodying a digital certificate may be implemented as a three-dimensional bar code, or another combination of graphical and/or text elements, or other suitable form of visually perceptible or machine-readable identifier. Surrounding the identifying feature 106 with the identifying feature 612, as in the embodiment of FIG. 6, facilitates picture-taking of the authenticating portion 600, as the location of the identifying feature 106 is clearly recognizable as being bounded by the identifying feature 612, and thus both the identifying feature 106 and the digital certificate 612 may be photographed at the same time. In the embodiment of FIG. 6, the identifying feature 612 is applied to the surface 610 by the item encoder 556 (although, as mentioned elsewhere in this disclosure, the identifying feature 612 may be attached to the item's packaging or otherwise associated with the item 102).

Figure 7:
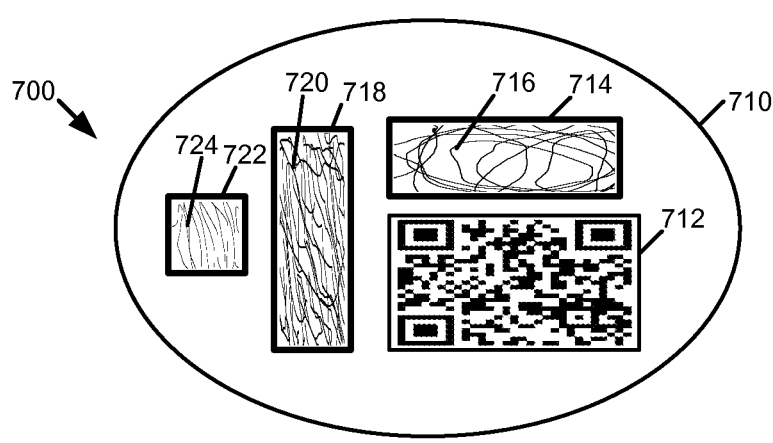

Referring now to FIG. 7, another embodiment of an authenticating portion 700 of the manufactured item 102 is shown. The authenticating portion 700 includes a surface 710. During manufacture of the item 102, the surface 710 is configured to include a number of identifying features 716, 720, and 724, which are defined by boundaries 714, 718, 722, respectively, in a similar fashion as described above. Each of the identifying features 716, 720, 724 includes an at least partially random "swirl" pattern or stochastic feature as described above. One or more of the identifying features 716, 720, 724 are used by the certificate generator 526 to create a digital certificate, which is embodied in an identifying feature 712, as described further below. The identifying feature 712 is applied by the item encoder 556 to the surface 710 so that it does not obscure at least those identifying feature(s) 716, 720, 724 that are used to create the identifying feature 712.

Figure 8:
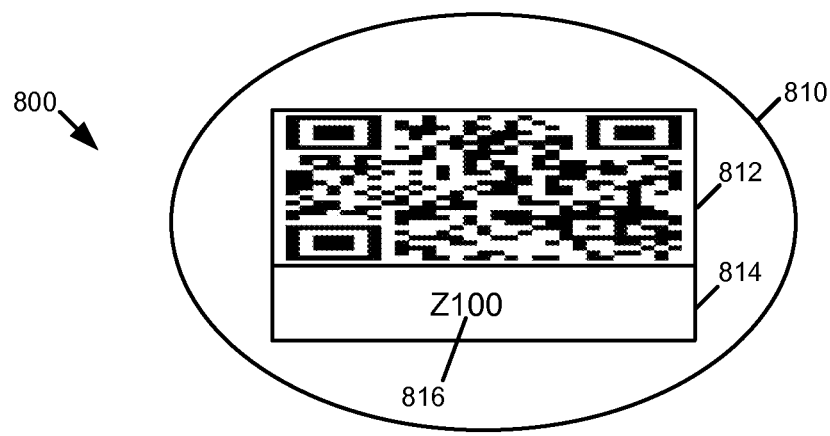
Figure 9:
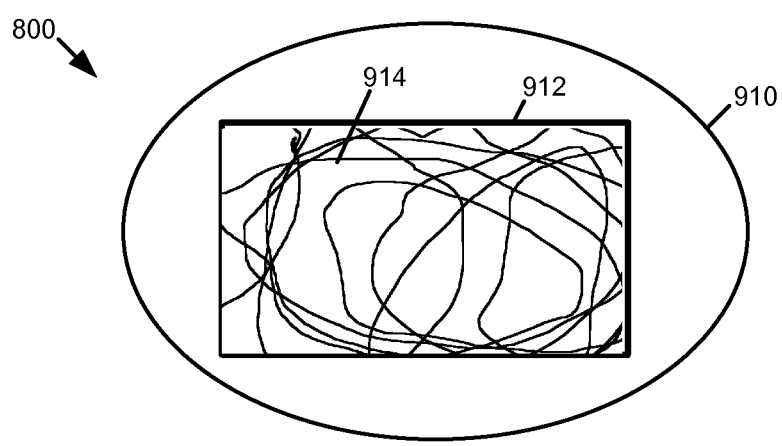

Referring to FIGS. 8-9, another embodiment of an authenticating portion 800 of the manufactured item 102 is shown. The authenticating portion 800 includes two surfaces 810, 910 that may oppose each other in some embodiments (as may be the case in, for instance, the dosage form example). An identifying feature 812, which embodies a digital certificate, is applied to the surface 810. The identifying feature 812 is located on the surface 810 so as to allow room for an area 814. A human-readable code or other information 816 may be imprinted, embossed or otherwise applied to the surface 810 in the area 814. The information 816 may include a brand name, product name, or other label associated with the item 102. For instance, in the dosage form example, the information 816 may include an identification code, label, or other marking that may be required by one or more government regulatory agencies.

The surface 910 is configured during manufacture of the item 102 to include an identifying feature 914, which includes an at least partially random, stochastic, chaotic, or otherwise unpredictable "swirl" pattern, design or feature as described above. The location of the identifying feature 914 on the surface 910 is defined by a boundary (e.g., coordinates) 912 in a similar fashion as described above.

In each case, the identifying feature 616, 716, 720, 724, 914 is selected so as to function as a unique identifier that cannot be economically reproduced by either the manufacturer or a would-be counterfeiter, and thus can be used to distinguish the individual item 102 from other items of the same or different types of items or products and. It should be appreciated by those skilled in the art that the "boundaries" 614, 712, 714, 718, 722, 912 need not be physically defined in or on the respective surface (although they could be), but rather may simply be a portion of the surface defined by one or more sets of coordinates derived from the digital representation of the identifying feature 616, 716, 720, 724, 914. Additionally, although the illustrative identifying features 616, 716, 720, 724, 914 are shown as rectangular in shape, it should be understood that identifying features may take any shape (regular or irregular) or size in other embodiments, according to the requirements of a particular design.

Referring now to FIG. 10, modules of the illustrative certificate generator application 526 are shown in greater detail. As mentioned above, the certificate generator processes one or more digital images of at least the identifying feature(s) 106 of the manufactured item 102 that are created by the imaging device 518. Accordingly, the certificate generator 526 interfaces with a digital image creator 1010 of the imaging device 518 using any suitable (now known or later developed) method or technique, as should be understood by those skilled in the art. As it is not part of the certificate generator 526, but rather is a module that is typically a standard feature of the computing device 510 (e.g., as part of the imaging device 518), the digital image creator 1010 is illustrated with dashed lines.

The certificate generator 526 is configured to analyze one or more digital representations of the identifying feature(s) 106 of the manufactured item 102, create the digital certificate 108 therefrom, and interface with the item encoder 556 via the network 536 to apply an identifying feature including the digital certificate 108 to, or otherwise associate the digital certificate 108 with, the item 102. For instance, in some embodiments, an identifying feature embodying the digital certificate 108 may be applied to a surface of the item 102, while in other embodiments, the identifying feature embodying the digital certificate 108 may not be physically attached to the item 102, but may be delivered by other means, such as via packaging, a product insert sheet or a digital download. The illustrative certificate generator 526 includes an image analyzer module 1012, a digital certificate generating module 1014, a communication module 1016, an identifying feature locating module 1018, an identifying feature selecting module 1020, and an error correcting module 1022.

The image analyzer module 1012 processes the digital images of the identifying features 106 using any suitable (now known or later developed) image processing methods or techniques, as should be understood by those skilled in the art. More specifically, the image analyzer module 1012 measures a stochastic feature of the item 102 that is part of the identifying feature(s) 106 as derived from the digital image created by the imaging device 518, and computes the digital fingerprint$_2$ therefrom. The stochastic feature measured by the image analyzer module 1012 is the same measurement characteristic used to generate the digital fingerprint$_1$. The illustrative image analyzer module 1012 includes an error-correcting module 1022, which may be used in the creation of the digital fingerprint$_2$ and/or the digital certificate 108. Further details of the operation of the image analyzer module 1012 and the error-correcting module 1022 are discussed below in connection with FIG. 11, which illustrates a method 1100, portions of which are executable by the image analyzer module 1012 and/or the error correcting module 1022.

The illustrative digital certificate generating module 1014 interfaces with the image analyzer module 1012 to obtain the results of the analysis of the digital representations of the identifying feature(s) 106 (namely, the digital fingerprint$_2$). The digital certificate generating module 1014 creates the digital certificate 108 using the digital fingerprint$_2$ and additional textual information supplied by the certifying authority (e.g., the manufacturer). The digital certificate generating module 1014 may, in some embodiments, interface with an identifying feature locating module 1018 and/or an identifying feature selecting module 1020. Further details of the operation of the digital certificate generating module 1014, the identifying feature locating module 1018, and the identifying feature selecting module 1020 are discussed below in connection with FIG. 11, which illustrates a method 1100, portions of which are executable by one or more of these modules. The illustrative communication module 1016 interfaces with the digital certificate generating module 1014 to obtain the digital certificate 108 for the item 102 or an identifying feature embodying the digital certificate 108. The communication module 1016 may interface with one or more of the peripheral devices 522, and/or the network interfaces 524, to output information relating to the digital certificate 108 in a human-perceptible form at the computing device 510, and/or to send the digital certificate 108 or an identifying feature embodying the digital certificate to the remote computing device 550 for use by the item encoder 556, for example.

Referring now to FIG. 11, an illustrative method 1100 for encoding an individual item of a manufactured product to prevent counterfeiting, which may be implemented as one or more computer-executable instructions, routines, processes or the like (e.g., software and/or firmware), is shown. At block 1110, the computing device 510 obtains a digital image of at least the authenticating portion 104 of the manufactured item 102. Block 1110 is illustrated with dashed lines, to illustrate that it is not a step that needs to be performed by the certificate generator 526.

At block 1112, the method 1100 determines the locations (e.g., coordinates) of the identifying features 106 on the digital image obtained at block 1110, and obtains digital representations of each of the identifying features 106, if there are more than one. To locate the identifying features, the method 1100 may analyze the digital fingerprint$_2$ to identify one or more areas on the item 102 that appear to have a greater degree of randomness or stochastic features. The boundaries described above with reference to FIGS. 6-9 may be defined as a result of this analysis.

Once the identifying feature or features 106 are defined at block 1112, then at block 1114, if there are multiple identifying features 106, the method 1100 may analyze the identifying features 106 and select one or more of them for use in creating the digital certificate 108. The criteria used at block 1114 to select an identifying feature may include, for example, the location of the identifying feature 106 relative to the desired placement of the identifying feature embodying the digital certificate 108 (e.g., bar code) on the item 102, the clarity and/or "randomness" (e.g., reproducibility or lack thereof) of the identifying feature 106, and/or other factors, depending on the requirements or design of a particular implementation of the method 1100.

At block 1116, the digital fingerprint$_2$ is created for each of the selected identifying features 106 in a similar fashion as described above. In general, a measurable characteristic of the identifying feature 106 is selected for use in creating the digital fingerprint. The measurable characteristic used to create the digital fingerprint$_2$ is the same measurable characteristic used to create the digital fingerprint$_1$. A defined measurement area of the identifying feature 106 is selected over which to measure the measurable characteristic. For example, the defined measurement area may be the area defined by the boundaries described above with reference to FIGS. 6-9. The defined measurement area used to create the digital fingerprint$_2$ is the same as the defined measurement area used to create the digital fingerprint$_1$. A suitable feature extraction algorithm (corresponding to the feature extraction algorithm of block 314 of FIG. 3) is applied to the defined measurement area to extract the measurable characteristic from the digital image created by the imaging device 518 and generate a bitstring that can be used as a unique identifier of the item 102.

At block 1126, an error correction method may be applied to the digital fingerprint$_2$ by the certifying authority (e.g., the manufacturer of the item 102. The "error correction vector" methods described above with reference to FIG. 3 may employ a reference model that can be used to reduce the effect of deviations between the digital representations of identifying features that are taken by the camera 118 and digital representations that are taken by the imaging device 518, or to correct for differences that occur from one image to another created at the same device. A suitable reference model may be established or defined at block 1128. For example, in the "offset" error correction technique, the reference model may stipulate that an N-dimensional vector of positive integers be used to determine the offset. In the simplified "discretizing" technique, the reference model may specify the terms for dividing and rounding (e.g., divide the digital fingerprint by 100 and then round to the nearest integer).

In the illustrative "offset" error correction method described above, the digital fingerprint$_2$ obtained by the certifying authority is compared to the reference model (e.g., an N-dimensional integer lattice reference model) to determine the offset (i.e., error correction vector) at block 1130, where the offset represents the difference between the digital fingerprint$_2$ and the reference model. The error correction vector or offset may be incorporated into the digital certificate 108 at block 1132. In the "full comparison" error correction technique described above (in which a one-to-one comparison of the digital fingerprint$_1$ and the digital fingerprint$_2$ is performed), the certifying authority may specify an acceptable tolerance range at block 1128, rather than a reference model. In this technique, block 1130 would be omitted, and the digital fingerprint$_2$ and the tolerance range (rather than an offset) may be incorporated into the digital certificate 108 (or stored in, e.g., a database) at block 1132.

At block 1118, the method 1100 creates the digital signature to be incorporated into the digital certificate 108. To do this, the method 1100 combines (e.g., concatenates) the digital fingerprint$_2$ and the textual information of the digital certificate 108 and computes a secure hash value therefrom. The secure hash value is input to a cryptographic algorithm, along with the cryptographic key 528 (e.g., the certifying authority's private key), to create the digital signature.

At block 1120, the method 1100 generates the digital certificate 108 using the digital signature generated at block 1118 and selected other information, such as the error correction information computed at block 1126, information about the item 102 and/or its manufacturer (e.g., batch number, expiration date, etc.). As discussed above, at block 1132, the error correction vector or offset calculated at block 1130 (or the digital fingerprint$_2$ and/or tolerance, or the "discretizing" model, as the case may be), can be incorporated into the digital certificate 108. The method 110 may then incorporate the digital certificate into an identifying feature (e.g., bar code, etc.), which may be applied to or otherwise associated with the item 102.

At block 1122, the method 1100 determines whether to repeat the foregoing blocks to generate another digital certificate for another item of the manufactured product. As noted above, each digital certificate 108 is intended to be unique to each individual item of the manufactured product. If additional digital certificates are to be generated for other items, then the method 1100 returns to block 1110. if no additional digital certificates are to be generated, then the method 1100 may end, or may proceed to block 1124. At block 1124, the method 1100 may utilize all or a portion of the item-specific digital certificates created previously to generate another identifying feature (e.g., bar code) that can be applied to a container that holds the manufactured items. For instance, the method 1100 may derive item serial numbers from the item-specific digital certificates, concatenate them, and use a cryptographic algorithm to generate an identifying feature that can be affixed to the container. Among other things, the container-specific digital certificate can be used, alone or in combination with one or more of the item-specific digital certificates, to validate the authenticity of multiple items in the container. For instance, in some embodiments, the container-specific digital certificate may be used to validate one or more items in a supply of such items, without having to remove them from their container.

Referring now to FIGS. 12-13, an illustrative container 1200 is shown, which can be used to facilitate the validation of items held in the container without having to remove them from the container. FIGS. 12 and 13 illustrate opposing sides of the container 1200. The container 1200 includes a receptacle body portion having a surface 1212, a surface 1312 (which may be integral with the surface 1212), a base 1214, and a removable cover or lid 1210, 1310. The surface(s) 1212, 1312 and base 1214 define an interior region 1216 in which the items 102 can be held. In the illustrative embodiment, the surface 1212 supports a window 1218, which is a substantially transparent portion of the surface 1212 defined to allow viewing of the contents of the container 1200 from the exterior. In other embodiments, the window 1218 may be defined in the cover 1210, the base 1214, or other suitable location on the container 1200. In some embodiments, the window 1218 may have a lens that effectively magnifies the image of the items 102 stored within container 1200 to facilitate imaging.

A pair of retainers 1220, 1222 are supported by the surface 1212 on opposing sides of the window 1218. The retainers 1220, 1222 are configured to hold a item 102 in a position adjacent the window 1218 while the item 102 is stored in the container 1200, so that the authenticating portion 104 of the item 102 can be photographed with the camera 118 from outside the container (e.g., through the window 1218), without removing the item 102 from the container. The retainers 1120, 1222 may include a detent or depression that preferentially aligns one or more of the items 102 stored in the container 1200 with the window 1218 to facilitate imaging. In some embodiments, one or more of the retainers 1120, 1122 may be defined in or the window 1218 itself. Further, while the illustrative embodiment shows two retainers 1220, 1222, it should be understood that any number of retainers (including zero) may be used in other embodiments, according to the requirements of a particular design. Also, while the illustrative embodiment shows retainers 1220, 1222 and window 1218 on the surface 1212, it should be understood that the retainers and window may be located anywhere on the container in other embodiments.

As shown in FIG. 13, the surface 1312 of the illustrative container 1200 supports a label 1314, which includes an identifying feature 1316, which embodies a digital certificate of the container-specific type described above. FIG. 13 also illustrates an alternative embodiment of a cover or lid 1310. The cover or lid 1310 has defined therein a window 1318, which is similar or analogous to the window 1218 described above.

While aspects of this disclosure have been illustrated and described in detail in the drawings and in the foregoing description, such illustrations and description are to be considered as exemplary and not restrictive in character, it being understood that only illustrative embodiments have been shown and described and that all changes and modifications that come within the spirit of the disclosure are desired to be protected. Further, while certain aspects of the present disclosure have been described in the context of an application for authenticating a dosage form of a human drug product, it will be understood that the various aspects have other applications, for example, any application in which it is desired to authenticate a manufactured product using a mobile computing device.

In addition, the mobile computing device 110 may be embodied in or as any type of computing device capable of performing the functions described herein. For example, while not typically considered "mobile" in so far as that term may be inferred by some as referring to a handheld device, it should be understood that aspects of this disclosure are applicable to other types of electronic devices, such as desktop computers, servers, enterprise computer systems, networks of computers, or other electronic appliances, or other electronic device(s) that are capable of performing the functions described herein, depending on the particular implementation of the item authenticating system 100 and/or the product encoding system 500.

The invention claimed is:

1. A system for protecting an item of a solid oral dosage form of a human drug product from counterfeiting, the system comprising at least one computing device configured to:
   analyze a first digital image of an at least partially random physical property of the item to create a numerical representation of the first digital image of the at least partially random physical property of the item, the at least partially random physical property being usable to distinguish the item from other items of the solid oral dosage form of the human drug product;
   execute a cryptographic algorithm using at least the numerical representation of the first digital image of the at least partially random physical property of the item and a first cryptographic key associated with a source of the item as inputs to the cryptographic algorithm, the cryptographic algorithm generating a digital signature that can be used to verify the authenticity of the item and to authenticate the source of the item;
   create a digital certificate including the digital signature, the digital signature being readable from the digital certificate by a camera of a mobile computing device;
   apply the digital certificate to the item so as not to obscure the at least partially random physical property of the item;
   analyze a second digital image of the at least partially random physical property of the item; and
   at the mobile computing device, authenticate the item based on the analyzed second digital image and the digital certificate using a second cryptographic key associated with the manufacturer, wherein the first and second cryptographic keys are different from one another but related to one another, and the first cryptographic key is a secret key not accessible to the mobile computing device.

2. The system of claim 1, configured to display information relating to authentication of the item at a personal mobile consumer electronic device.

3. The system of claim 1, configured to send information relating to authentication of the item to at least one of a tracking system for tracking the location of counterfeit versions of the item and a usage monitoring system for monitoring usage of the item by one or more persons.

4. A solid oral dosage form of a human drug product comprising:
   a drug substance; and
   an inactive ingredient added during manufacture of the dosage form to create, in at least one surface of the dosage form, a first identifier comprising an at least partially random physical property of the item, the at least partially random physical property being usable to distinguish the item from other items of the solid oral dosage form of the human drug product; and
   a second identifier applied to at least one surface of the drug product so as not to obscure the first identifier, wherein the second identifier comprises a code created using a numerical representation of a digital image of the first identifier and a cryptographic key associated with a source of the item as inputs to a cryptographic algorithm, the second identifier being usable to verify the authenticity of the item and to authenticate the source of the item at a mobile computing device, the cryptographic key being a secret key of a cryptographic key pair, and the first identifier and the second identifier are both readable by a camera of the mobile computing device.

5. The dosage form of claim 4, wherein the second identifier comprises a digital signature generated by a certifying authority associated with a manufacturer of the dosage form.

6. The dosage form of claim 4, wherein the second identifier comprises information to determine a location of the first identifier on the dosage form.

7. The dosage form of claim 4, wherein the first identifier is located at a first location on a surface of the dosage form, the second identifier is located at a second location on the surface of the dosage form, and the second location is spaced from and substantially surrounds the first location.

8. The dosage form of claim 4, comprising a first surface and a second surface opposing the first surface, wherein the first identifier is located on the first surface and the second identifier is applied to the second surface.

9. The dosage form of claim 4, wherein the at least partially random visual feature comprises at least one human-ingestible coloring agent added during manufacture of the dosage form.

10. The dosage form of claim 9, wherein the at least partially random visual feature results from imperfectly blending or mixing the at least one human-ingestible coloring agent with the drug substance during manufacture of the dosage form.

11. The dosage form of claim 9, wherein the at least partially random visual feature results from applying the at least one human-ingestible coloring agent to at least one surface of the dosage form during manufacture of the dosage form.

12. A container to hold a plurality of items of the dosage form of claim 4, comprising a receptacle, a cover removably coupled to the receptacle, a window defined in at least one of the receptacle and the cover, and at least one retainer, wherein the window is configured to facilitate reading of the first identifier and the second identifier by the camera of the mobile computing device, and the retainer is configured to hold one of the items in a position to facilitate reading of the first identifier and the second identifier of the one item by the camera of the mobile computing device.

13. The container of claim 12, comprising a surface, wherein a third identifier relating to the dosage form is supported by the surface and the third identifier is derived at least in part from the first and second identifiers.

14. A method of validating items of a solid oral dosage form of a human drug product using the container of claim 13, comprising generating a first digital image of the third identifier, generating a second digital image of the first and second identifiers of one of the plurality of items through the window, and comparing the first and second digital images to validate the items.

15. A method for marking an item of a solid oral dosage form of a human drug product to prevent counterfeiting of the item, the method comprising:
   introducing an inactive ingredient to create an at least partially random physical property of the item in a surface of the item during manufacture of the item, the at least partially random physical property being usable to distinguish the item from other items of the solid oral dosage form of the human drug product;
   defining a first identifier to uniquely distinguish the item from other items of the same product and from other products, wherein the first identifier comprises a two-dimensional portion of the at least partially random physical property of the item that is readable by a camera of a mobile computing device;

generating a computer-readable image of the first identifier;

generating a second identifier based on the computer-readable image of the first identifier and a first cryptographic key associated with a manufacturer of the item by executing a cryptographic algorithm using at least a numerical representation of the computer-readable image of the first identifier and the first cryptographic key as inputs to the cryptographic algorithm, the second identifier being usable to verify the authenticity of the item and to authenticate the manufacturer of the item at a mobile computing device, the first cryptographic key being part of a cryptographic key pair in which the first cryptographic key is a secret key and a second cryptographic key is different from but related to the first cryptographic key, and the second cryptographic key is stored in the mobile computing device; and applying the second identifier to at least one surface of the item so as not to obscure the first identifier, the second identifier being readable by a camera of the mobile computing device.

16. The method of claim 15, comprising determining a location of the first identifier on the item and including information relating to the location of the first identifier in the second identifier.

17. The method of claim 15, comprising defining a plurality of first identifiers, selecting one of the plurality of first identifiers, and generating the second identifier based on a computer-readable image of the selected first identifier.

18. The method of claim 15, comprising defining a plurality of first identifiers and generating the second identifier based on the plurality of first identifiers.

19. The method of claim 15, comprising generating a digital fingerprint from the computer-readable image of the first identifier and applying an error correction technique to the digital fingerprint.

20. The method of claim 15, comprising introducing a plurality of human-ingestible coloring agents during manufacture of the item to create the at least partially random feature.

21. A method of determining the authenticity of an item of a solid oral dosage form of a human drug product using a mobile computing device, the method comprising:

at a mobile computing device:

receiving a digital image of at least an authenticating portion of the item created with a camera of the mobile computing device, wherein the digital image comprises a digital representation of a first identifier comprising an at least partially random physical property of a surface of the item that is defined to uniquely identify the item from other items of the solid oral dosage form of the human drug product, and a digital representation of a second identifier cryptographically related to the first identifier by a cryptographic algorithm executed using at least the digital representation of the first identifier and a first cryptographic key as inputs to the cryptographic algorithm;

analyzing the digital representations of the first and second identifiers derived from the digital image; and determining whether the item is authentic to a manufacturer of the item based on the digital representations of the first and second identifiers and using a second cryptographic key associated with the manufacturer and stored at the mobile computing device, the first and second cryptographic keys being different from but related to one another and the first cryptographic key being a secret key.

22. The method of claim 21, comprising determining whether the item is authentic to the manufacturer without accessing data that is remote from the mobile computing device.

23. The method of claim 21, wherein the second identifier comprises a digital signature created using the first identifier, comprising verifying the digital signature using the cryptographic key.

24. The method of claim 21, wherein the second identifier comprises information relating to at least one of the item, the manufactured product, and the manufacturer of the item.

25. The method of claim 24, comprising displaying an indication of whether the item is authentic and the information relating to at least one of the item, the dosage form, and the manufacturer of the item at the mobile computing device.

26. A computer-accessible storage medium comprising a plurality of instructions executable by a personal mobile consumer electronic device to:

determine, from at least one digital image of an individual item of a solid oral dosage form of a human drug product created by a digital camera of the personal mobile consumer electronic device, digital representations of a first identifier and a second identifier, wherein the first identifier comprises an at least partially random physical property of the item that is defined to uniquely identify the item from other items of the solid oral dosage form of the human drug product, and the second identifier is cryptographically related to the first identifier by a cryptographic algorithm executed using at least the digital representation of the first identifier and a first cryptographic key as inputs to the cryptographic algorithm;

generate, from the digital representation of the first identifier, a first digital fingerprint comprising a numerical representation of the digital representation of the first identifier;

derive, from the digital representation of the second identifier, a second digital fingerprint comprising a numerical representation of the digital representation of the second identifier and a digital signature;

at the personal mobile consumer electronic device, authenticate the item as being authentic to a manufacturer based on the first digital fingerprint, the second digital fingerprint, the digital signature, and a second cryptographic key stored at the personal mobile consumer electronic device, the first and second cryptographic keys being different from but related to one another and the first cryptographic key being a secret key;

display information relating to at least one of the item, the dosage form, the manufacturer, and a person associated with the personal mobile consumer electronic device and the item, at the personal mobile consumer electronic device, in response to determining that the item is authentic to the manufacturer; and output, in a human-perceptible form, at the personal mobile consumer electronic device, an indication that the item is not authentic, in response to determining that the item is not authentic to the manufacturer.

27. The computer-accessible storage medium of claim 26, wherein the plurality of instructions are executable by the personal mobile consumer electronic device to send information relating to usage of the item by a person associated with the personal mobile consumer electronic device to at least one remote computing device in response to determining whether the item is authentic to the manufacturer, and the at least one remote computing device is associated with at least one of the manufacturer, a supplier of the dosage form, a distributor of the dosage form, a provider of a software application for managing or tracking information relating to items of the dosage form, and a provider of a software application for managing or tracking information relating to use of the dosage form by one or more persons.

28. The computer-accessible storage medium of claim 27, wherein the plurality of instructions are executable by the personal mobile consumer electronic device to associate information relating to the item and information relating to a geographic location of the personal mobile consumer electronic device and send the item and geographic location information to the at least one remote computing device.

29. The computer-accessible storage medium of claim 26, wherein the plurality of instructions are executable by the personal mobile consumer electronic device to display, at the personal mobile consumer electronic device, a notification associated with the information relating to at least one of the item, the dosage form, and the manufacturer, in response to determining that the item is authentic to the manufacturer.

30. The computer-accessible storage medium of claim 29, wherein the plurality of instructions are executable by the personal mobile consumer electronic device to determine a status of the item based on the information relating to at least one of the item, the manufactured product, and the manufacturer and generate the notification based on the status of the item.

31. The computer computer-accessible storage medium of claim 26, wherein the plurality of instructions are executable by the personal mobile consumer electronic device to display, at the personal mobile consumer electronic device, information relating to at least one of an expiration date of the item and a prescription associated with the item and the person associated with the personal mobile consumer electronic device, in response to determining whether the item is authentic to the manufacturer.

\* \* \* \* \*